(12) United States Patent
Byrne et al.

(10) Patent No.: US 11,062,026 B2
(45) Date of Patent: *Jul. 13, 2021

(54) COUNTER-FRAUD OPERATION MANAGEMENT

(71) Applicant: International Business Machines Corporation, Armonk, NY (US)

(72) Inventors: Brian P. Byrne, Austin, TX (US); Sushain Pandit, Austin, TX (US); Kalaivanan Saravanan, Pondicherry (IN); Yogendra K. Srivastava, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/741,840

(22) Filed: Jan. 14, 2020

(65) Prior Publication Data
US 2020/0151330 A1    May 14, 2020

Related U.S. Application Data

(63) Continuation of application No. 15/429,145, filed on Feb. 9, 2017, now Pat. No. 10,607,008.

(51) Int. Cl.
*G06F 21/55* (2013.01)
*G06F 16/2457* (2019.01)

(52) U.S. Cl.
CPC ...... *G06F 21/554* (2013.01); *G06F 16/24575* (2019.01); *G06F 2221/034* (2013.01)

(58) Field of Classification Search
CPC ............. G06F 16/24575; G06F 21/554; G06F 2221/034; G06F 17/30528; G06Q 50/265; G06Q 30/0225; G06Q 30/02; H04L 63/0227; H04L 63/1425
See application file for complete search history.

(56) References Cited

U.S. PATENT DOCUMENTS

| | | | |
|---|---|---|---|
| 5,280,833 | A | 1/1994 | Robin |
| 5,380,569 | A | 1/1995 | Kujas et al. |
| 5,589,285 | A | 12/1996 | Cable et al. |
| 5,597,775 | A | 1/1997 | Martin et al. |

(Continued)

OTHER PUBLICATIONS

Kalyan Veeramachaneni et al., AI2 : Training a big data machine to defend, IEEE 2nd International Conference on Big Data Security on Cloud (BigDataSecurity), (Year: 2016).*

(Continued)

*Primary Examiner* — Shanto Abedin
(74) *Attorney, Agent, or Firm* — L. Jeffrey Kelly

(57) ABSTRACT

Disclosed aspects relate to counter-fraud operation management. A counter-fraud operation may be executed using an initial set of parameter values for a set of parameters of the counter-fraud operation. A set of user counter-fraud activities of a user may be monitored corresponding to a user interface. A set of user feedback data may be captured to determine a feedback-driven set of parameter values for a set of parameters of the counter-fraud operation. The feedback-driven set of parameter values may be determined for the set of parameters of the counter-fraud operation. The counter-fraud operation using the feedback-driven set of parameter values may be executed.

20 Claims, 9 Drawing Sheets

(56) References Cited

U.S. PATENT DOCUMENTS

| | | | |
|---|---|---|---|
| 5,706,338 A | 1/1998 | Relyea et al. | |
| 5,793,131 A | 8/1998 | Fisher et al. | |
| 9,053,307 B1 | 6/2015 | Johansson | |
| 9,508,075 B2 | 11/2016 | Geckle | |
| 9,621,582 B1 | 4/2017 | Hirsh | |
| 10,115,108 B1 | 10/2018 | Gendelev | |
| 10,628,834 B1* | 4/2020 | Agarwal | G06Q 30/0185 |
| 2009/0099884 A1 | 4/2009 | Hoefelmeyer | |
| 2009/0106151 A1 | 4/2009 | Nelsen | |
| 2010/0100693 A1* | 4/2010 | Kerley | G06Q 40/00 |
| | | | 711/154 |
| 2011/0225650 A1* | 9/2011 | Margolies | G06Q 10/06 |
| | | | 726/22 |
| 2013/0024339 A1 | 1/2013 | Choudhuri | |
| 2013/0024358 A1 | 1/2013 | Choudhuri | |
| 2014/0012738 A1* | 1/2014 | Woo | G06Q 20/384 |
| | | | 705/39 |
| 2014/0081652 A1 | 3/2014 | Klindworth | |
| 2014/0201836 A1* | 7/2014 | Amsler | H04L 63/20 |
| | | | 726/23 |
| 2014/0237599 A1* | 8/2014 | Gertner | H04L 63/1441 |
| | | | 726/24 |
| 2014/0278479 A1* | 9/2014 | Wang | G06Q 10/10 |
| | | | 705/2 |
| 2014/0337044 A1 | 11/2014 | Heinze | |
| 2015/0026027 A1 | 1/2015 | Priess | |
| 2015/0046224 A1 | 2/2015 | Adjaoute | |
| 2015/0242856 A1* | 8/2015 | Dhurandhar | G06Q 50/01 |
| | | | 705/44 |
| 2016/0042287 A1* | 2/2016 | Eldardiry | G06Q 50/00 |
| | | | 706/14 |
| 2016/0088006 A1* | 3/2016 | Gupta | H04L 43/08 |
| | | | 726/23 |
| 2016/0335551 A1 | 11/2016 | Droll | |
| 2016/0379309 A1 | 12/2016 | Shikhare | |
| 2017/0093902 A1* | 3/2017 | Roundy | H04L 63/1416 |
| 2017/0147654 A1 | 5/2017 | Saperstein | |
| 2018/0033009 A1* | 2/2018 | Goldman | G06Q 40/10 |
| 2018/0225449 A1 | 8/2018 | Byrne | |
| 2018/0225450 A1 | 8/2018 | Byrne | |

OTHER PUBLICATIONS

Fawcett et al.; "Adaptive Fraud Detection"; Data Mining and Knowledge Discovery; 1997; <http://www.acc.ncku.edu.tw/chinese/faculty/shulc/courses/cas/articles/adaptive-fraud-detection.pdf>.

Furlan et al.; "Holistic Approach to Fraud Management in Health Insurance"; Journal of Information and Organizational Sciences; 2008; <hhttps://jios.foi.hr/index.php/jios/article/view/80/61>.

Phulari et al.; "Pattern Analysis and Fraud Detection Using Hadoop Framework"; International Journal of Engineering Science and Innovative Technology; 2016; <http://www.ijesit.com/Volume%205/Issue%201/IJESIT201601_14.pdf>.

SPARQL Working Group; "Feature:PathLength"; W3C; <https://www.w3.org/2009/sparql/wiki/Feature:PathLength>.

Tagaris et al.; "Integrated Web Services Platform for the facilitation of fraud detection in health care e-government services"; Information Technology and Applications in Biomedicine; 2009 <http://www.stefan-rueping.de/publications/tagaris-etal-2009.pdf>.

IBM: List of IBM Patents or Patent Applications Treated as Related (Appendix P), Jan. 14, 2020, 2 pages.

\* cited by examiner

800

900

COUNTER-FRAUD OPERATION MANAGEMENT

BACKGROUND

This disclosure relates generally to computer systems and, more particularly, relates to counter-fraud operation management. Counter-fraud operation management systems may use data to flag various activities. The amount of data related to fraud identification is increasing. As the amount of data increases, the need for counter-fraud operation management may also increase.

SUMMARY

Aspects of the disclosure relate to counter-fraud management. User feedback may be captured during triage and semantic analysis may be performed using graphs. User feedback may be translated into a quantifiable, cumulative score in order to adjust thresholds to reduce the overall rate of false-positive identifications and enhance the system over time. The user feedback may be captured with respect to user input, user activity, or temporal aspects before being translated into abstraction scores. The abstraction scores may be weighted to form a cumulative score, which may be used to adjust thresholds for reducing the rate of false-positive alerts produced by the counter-fraud management system. Accordingly, a counter-fraud operation management engine may use a machine-learning technique to adjust one or more parameters to provide the user with a decreased amount of false-positive identifications.

Disclosed aspects relate to counter-fraud operation management. A counter-fraud operation may be executed using an initial set of parameter values for a set of parameters of the counter-fraud operation. A set of user counter-fraud activities of a user may be monitored corresponding to a user interface. A set of user feedback data may be captured to determine a feedback-driven set of parameter values for a set of parameters of the counter-fraud operation. The feedback-driven set of parameter values may be determined for the set of parameters of the counter-fraud operation. The counter-fraud operation using the feedback-driven set of parameter values may be executed.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
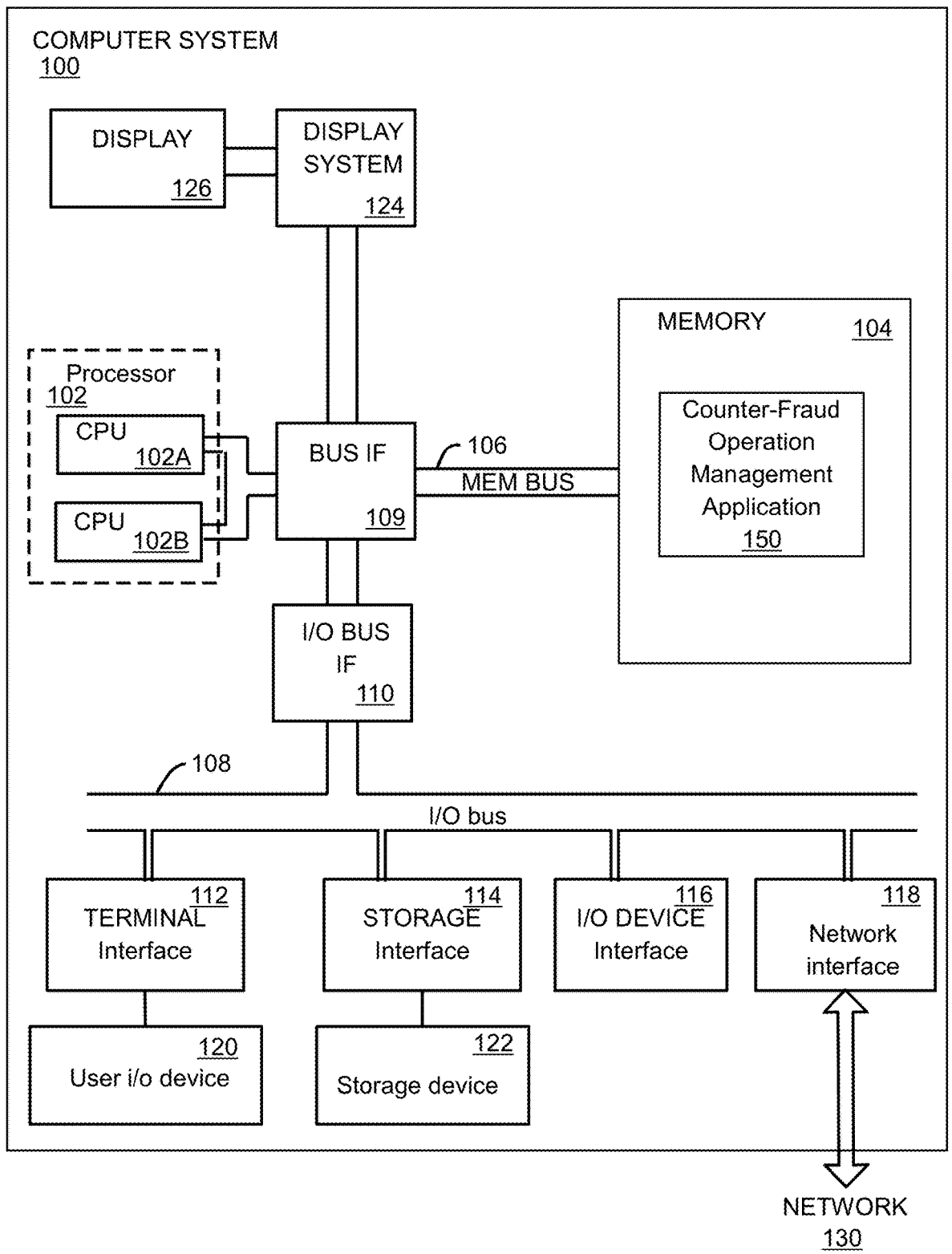
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to counter-fraud management. User feedback may be captured during triage and semantic analysis may be performed using graphs. User feedback may be translated into a quantifiable, cumulative score in order to adjust thresholds to reduce the overall rate of false-positive identifications and enhance the system over time. The user feedback may be captured with respect to user input, user activity, or temporal aspects before being translated into abstraction scores. The abstraction scores may be weighted to form a cumulative score, which may be used to adjust thresholds for reducing the rate of false-positive alerts produced by the counter-fraud management system. Accordingly, a counter-fraud operation management engine may use a machine-learning technique to adjust one or more parameters to provide the user with a decreased amount of false-positive identifications.

Counter-fraud management systems may provide actionable insights to identify fraudulent activity as well as a management environment for the investigation and mitigation of fraud. Scoring and analytic routines may be executed over transactional and reference data. The result of the scoring and analytics may be an identified probability of fraud. If the result of performing the assessment is above a certain threshold, an action may be triggered. In certain embodiments, an automatic alert may be generated to open a case in order to track and investigate detected fraud. If the score is not above a certain predefined threshold, an action may not be taken. If an action is taken to raise an alert, a triage analyst may determine whether the alert is a false-positive by looking at related entities or related alerts that may be of essence within the context of the raised alert. In a typical counter-fraud management system, a learning component may not be included. The thresholds may not have the ability to adjust over time with feedback from the user. The action component may not have the ability to raise an alert in certain scenarios if there exists a fraudulent-indicative relationship based on semantic data. There may be a desire for a system and method which incorporates a learning component to adjust thresholds and introduce secondary thresholds based on semantic data.

Aspects of the disclosure relate to a system, method, and computer program product for counter-fraud operation management. A counter-fraud operation may be executed using an initial set of parameter values for a set of parameters of the counter-fraud operation. A set of user counter-fraud activities of a user may be monitored corresponding to a user interface. A set of user feedback data may be captured to determine a feedback-driven set of parameter values for a set of parameters of the counter-fraud operation. The feedback-driven set of parameter values may be determined for the set of parameters of the counter-fraud operation. The counter-fraud operation using the feedback-driven set of parameter values may be executed.

In various embodiments, the set of user feedback data may include a set of user inputs data, a set of user-interaction module data, a set of user action sequence data, or a set of temporal-oriented activity data. In various embodiments, a set of confidence scores may be ascertained based on the set of user feedback data. In certain embodiments, a set of module abstraction scores may be computed based on the set of user-interaction module data in the set of user feedback data. In certain embodiments, a set of weighted activity complexity scores may be computed based on the set of user feedback data. In various embodiments, the feedback-driven set of parameter values for the set of parameters may be overridden based on a set of fraud-indicative relationships determined using a set of ontology data. Altogether, aspects of the disclosure can have performance or efficiency benefits. Aspects may save resources such as bandwidth, disk, processing, or memory. As an example, bandwidth may be saved through counter-fraud operation management. Executing the counter-fraud operation using the feedback-driven set of parameter values may result in the filtering-out of a higher number of false-positive identifications of fraud events. The user (e.g., analyst) may be provided with a smaller number of possible fraud events, which may require less bandwidth than if the user were provided with all possible fraud events (including false-positives). Other examples of saving bandwidth using counter-fraud operation management may also be possible.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a counter-fraud operation management application 150. In embodiments, the counter-fraud operation management application 150 may include instructions or statements that execute on the processor 102 or instructions or statements that are interpreted by instructions or statements that execute on the processor 102 to carry out the functions as further described below. In certain embodiments, the counter-fraud operation management application 150 is implemented in hardware via semiconductor devices, chips, logical gates, circuits, circuit cards, and/or other physical hardware devices in lieu of, or in addition to, a processor-based system. In embodiments, the counter-fraud operation management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
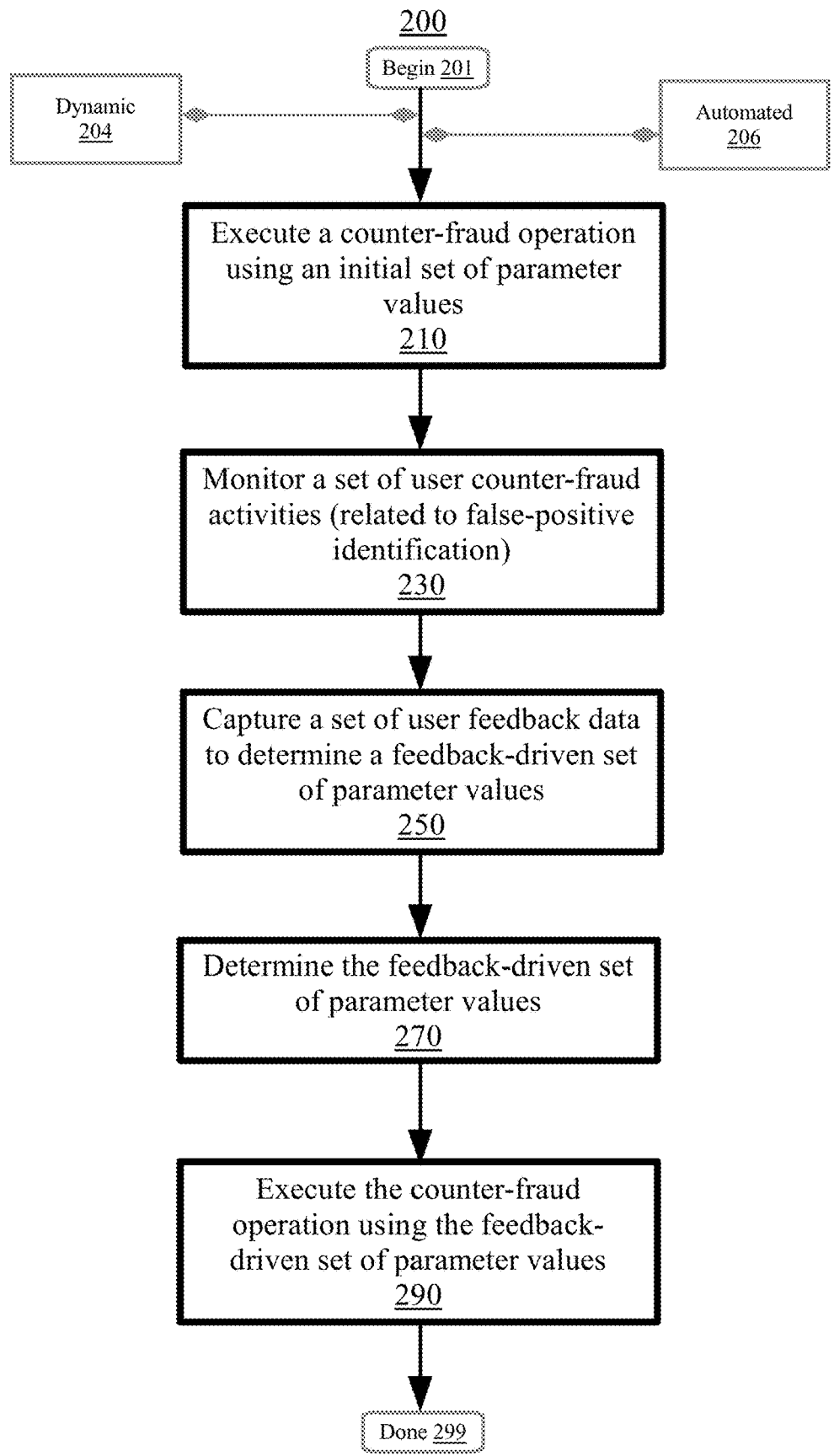
FIG. 2 is a flowchart illustrating a method of counter-fraud operation management, according to embodiments.

FIG. 2 is a flowchart illustrating a method 200 of counter-fraud operation management. A counter-fraud management system may perform scoring and analytics on fraud-suspect data ingested from input sources, triggered by monitoring an entity (e.g., party, account, physical object, transaction, event). The scoring may be statistical or predictive in nature. If the result of performing the assessment is above a threshold, an action may be triggered. If the score is not above a certain predefined threshold, the action may not be taken. If an action is taken to raise an alert, a user (e.g., analyst) may triage (e.g., assign degrees of urgency) the alert to determine whether the alert was a false-positive. The analyst may perform this by looking at related entities or related alerts that may relate to the context of the alert. The method 200 may begin at block 201.

In embodiments, the executing with respect to the first set of data, the monitoring, the capturing, the determining, the executing with respect to the second set of data, and the other steps described herein may each be carried-out in a dynamic fashion at block 204. The steps described herein may be carried-out in a dynamic fashion to streamline counter-fraud operation management. The set of operational steps may occur in real-time, ongoing, or on-the-fly. As an example, one or more operational steps described herein may be carried-out in an ongoing basis to facilitate, promote, or enhance counter-fraud operation management. Other examples may also be possible.

In embodiments, the executing with respect to the first set of data, the monitoring, the capturing, the determining, the executing with respect to the second set of data, and the other steps described herein may each be carried-out in an automated fashion at block 206. The steps described herein may be carried-out in an automated fashion without user intervention. The operational steps may each occur in an automated fashion without user intervention or manual action (e.g., using automated computer machinery, fully machine-driven without manual stimuli). The automated operational steps may be performed by a counter-fraud operation management engine (e.g., as part of a data management system) a cloud management engine (e.g., as part of a cloud environment), or the like.

At block 210, a counter-fraud operation may be executed. Generally, executing may include performing, implementing, carrying-out, or instantiating. A counter-fraud operation may include an action, algorithm, implementation code, or process which analyzes, probes, processes, offsets, or responds to a potential fraud event (e.g., a forged check, credit card theft, unusual transactions, international transactions). The executing may occur with respect to a first set of data. The first set of data may include reference sources (e.g., watch lists, fraud indicators, parties, accounts, channels, physical outlets) or transactional sources (e.g., transactions, events). The first set of data may include transactional records (e.g., ATM records, bank records, credit card statements). The executing may occur using an initial set of parameter values for a set of parameters of the counter-fraud operation. The parameters may include a number with respect to a certain type of transaction which may indicate a potential fraud event (e.g., a number of international transactions, a number of unusual transactions). The initial set of parameter values may include criterion, frameworks, or specifications with respect to the parameters for the counter-fraud operation (e.g., five international transactions in one day, three unusual transactions in one week).

Consider the following example. An application program may be run to monitor, detect, or identify one or more transactions. An analyst may be provided with a number of alerts which may indicate a possible fraud event. One of the alerts may include credit card transactions taking place in a country where the credit card holder has never made a transaction before. The parameters of the counter-fraud operation management engine may be set to display any transaction in a foreign country. Another alert may include an ATM withdrawal exceeding a threshold value (e.g., 400). The parameters of the counter-fraud operation management engine may be preset to display any ATM withdrawal exceeding a threshold value of 400. An ATM withdrawal of only 200 may not be displayed to the analyst as an alert since the ATM withdrawal does not exceed the threshold. Other examples of executing a counter-fraud operation using an initial set of parameter values may also be possible.

At block 230, a set of user counter-fraud activities of a user may be monitored corresponding to a user interface. Generally, monitoring can include detecting, recognizing, observing, listening, tracking, or discovering. The set of user counter-fraud activities may include actions, wait-times, or the like pertaining to the counter-fraud operation (e.g., set of user inputs, set of user-accessed modules, sequence of a set of user actions, set of temporal periods). The set of user counter-fraud activities may be monitored via interaction between the user and the computer system. The monitoring may occur related to false-positive identification with respect to the first set of data. A false-positive identification may include a flagging or marking of an activity which incorrectly indicates that fraud is present.

Consider the following example. The analyst may be provided with an alert which indicates a credit card being used for a transaction in a country where the credit card holder has never made transactions before. The number of international transactions (e.g., 5) may exceed a threshold number of international transactions (e.g., 4). The analyst may determine a false-positive identification and close the case (because no fraud is present). The analyst closing the alert may be a user action which indicates a false-positive identification. The analyst may close the alert after only five seconds. The short length of time in which the analyst identified a false-positive may be a temporal period which indicates a false-positive identification. Other examples of monitoring a set of user counter-fraud activities of a user related to a false-positive identification may also be possible.

At block 250, a set of user feedback data may be captured. Generally, capturing may include collecting, recording, storing, accumulating, obtaining, or gathering. The set of user feedback data may include information (provided via the actions of the user) pertaining to counter-fraud activities. The set of user feedback data may include a set of user input data, a set of user-interaction module data, a set of user action sequence data, a set of temporal-oriented activity data, or the like. The set of user feedback data may be collected in a computer-readable data format. The captured or recorded set of user feedback data may be manipulated or edited for analysis. The capturing may occur based on the set of user counter-fraud activities which relates to false-positive identification of the user corresponding to the user interface with respect to the first set of data. The user feedback data may be captured to determine a feedback-driven set of parameter values for the set of parameters of the counter-fraud operation. The feedback-driven set of parameter values may include new criterion, frameworks, or specifications for the set of parameters of the counter-fraud operation based on the user feedback data.

Consider the following example. The analyst may determine that the international credit card transaction (as described herein) is a false-positive identification of a fraud event. A set of user feedback data may be captured based on the false-positive identification. As an example, the analyst quickly (e.g., in five seconds) closed the case. The analyst may also close the case without entering any comments, opening any modules, or sending any messages. The described user feedback data may be captured in a computer-readable data format for analysis. The captured data may indicate that the feedback-driven set of parameter values for the set of parameters should be changed. Since the case was identified as a false-positive, similar cases (e.g., five foreign transaction) may also be false-positives. The captured data may indicate that a parameter value of five foreign transaction may not be sufficient to indicate a fraud event. A new set of parameter values (e.g., feedback-driven parameter values). Other examples of capturing a set of user feedback data may also be possible.

At block 270, the feedback-driven set of parameter values for the set of parameters of the counter-fraud operation may be determined. Generally, determining can include resolving, computing, formulating, analyzing, identifying, evaluating, or ascertaining. The determining may occur based on the set of user feedback data. The user feedback data may be analyzed for information with respect to false-positive identification. As an example, if a user quickly identifies a false-positive, the parameters or thresholds may be raised to filter out more false-positive fraud events. Data may be flagged based on the set of user feedback data. The counter-fraud operation management engine may determine how to adjust, change, fulfill, or replace parameter values based on the set of user feedback data.

Consider the following example. The analyst described herein may have indicated through user feedback data that the alert was a false-positive. The captured set of user feedback data may indicate that the set of parameter values for the set of parameters of the counter-fraud operation should be changed to allow a smaller amount of false-positive fraud events to be flagged as fraud events. A new set of parameter values may be determined based on the set of user feedback data. The foreign transaction threshold may be raised to filter-out more false-positive fraud events. As an example, transactions may only be flagged as possible fraud if they exceed a greater threshold number of foreign transactions (e.g., ten). Other examples of determining the feedback-driven set of parameter values for the set of parameters of the counter-fraud operation may also be possible.

At block 290, the counter-fraud operation may be executed. Generally, executing may include performing, implementing, carrying-out, or instantiating. The executing may occur with respect to a second set of data. The second set of data may include new determined values based on the set of user feedback data. The second set of data may be different from the first set of data but may be of a similar type or kind. The executing may occur using the feedback-driven set of parameter values for the set of parameters based on the set of user feedback data. The counter-fraud operation management engine may use a machine-learning technique to adjust the parameters to provide the user with a decreased amount of false-positive identifications. The counter-fraud operation may be executed based on the second set of data to adjust the performance of the counter-fraud operation over time. The parameter values may be continually (e.g., dynamically) changed to filter-out false-positive alerts of a fraud event.

Consider the following example. The analyst (as described herein) may be presented with new alerts which are flagged as transactions with possible fraud events. The new cases may exceed a threshold number of ten foreign transactions. In this way, the analyst may be presented with less false-positive identifications. The parameter values may dynamically adjust based on user feedback data. As an example, the threshold number (e.g., ten) may not be high enough. There may still be several false-positive identifications detected by the analyst. The feedback-driven set of parameter values may be dynamically changed (e.g., increased to fourteen). The parameters may be adjusted to reduce the overall rate of false-positives and enhance the identification of fraud events in a counter-fraud operation management system. Other examples of executing the counter-fraud operation using the feedback-driven set of parameter values may also be possible.

Method 200 concludes at block 299. Aspects of method 200 may provide performance or efficiency benefits related to counter-fraud operation management. Aspects may save resources such as bandwidth, processing, or memory. As an example, using counter-fraud operation management may save processing time. Executing the counter-fraud operation with the feedback-driven set of parameter values may filter-out a higher number of false-positive identifications of fraud events. The analyst may be provided with more relevant, true-positive identifications of fraud events, which may require less processing time. Other examples of saving processing time may also be possible.

Figure 3:
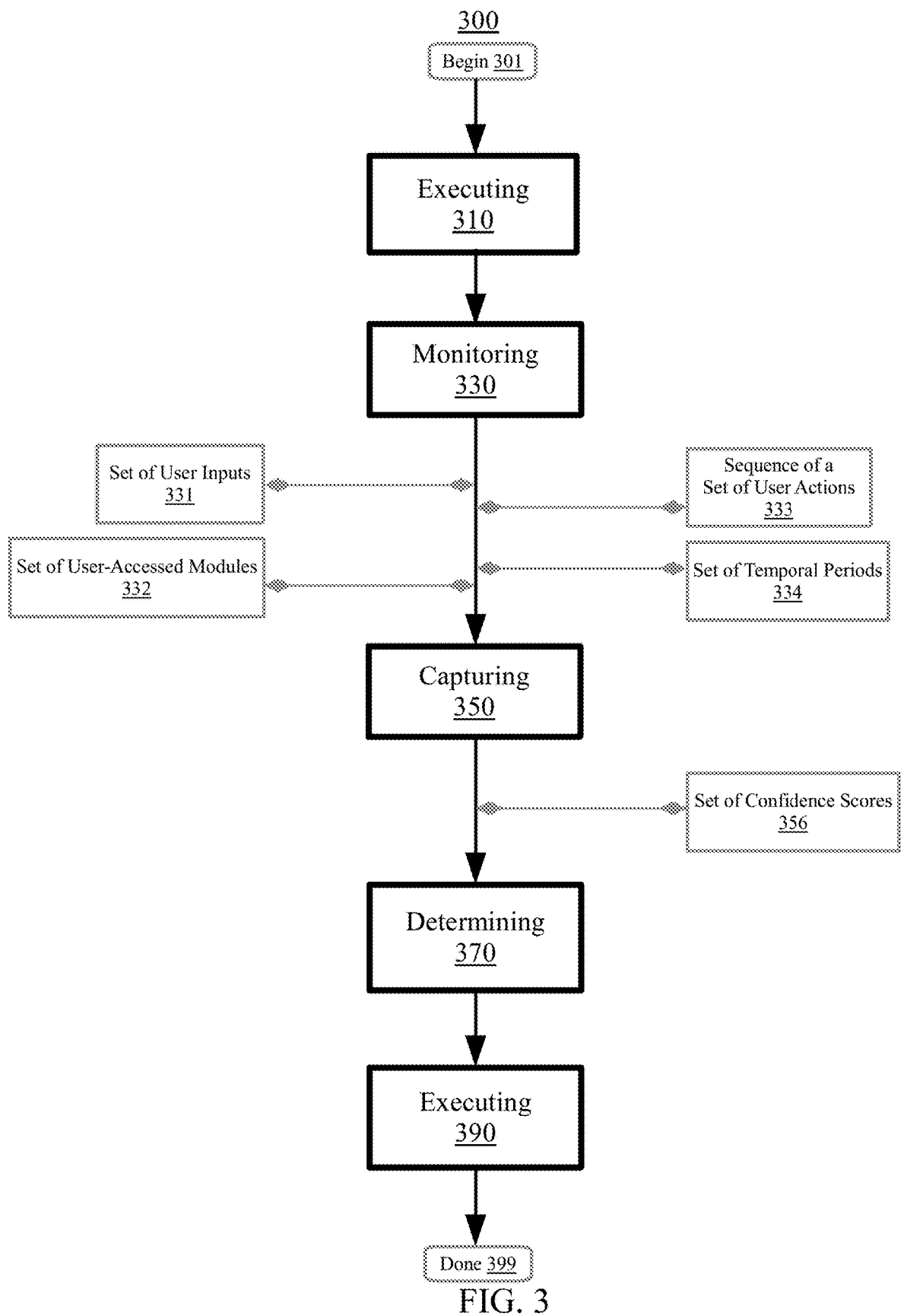
FIG. 3 is a flowchart illustrating a method of counter-fraud operation management, according to embodiments.

FIG. 3 is a flowchart illustrating a method 300 of counter-fraud operation management. Aspects of method 300 may be similar or the same as aspects of method 200, and aspects may be utilized interchangeably with one or more methodologies described herein. The method 300 may begin at block 301. At block 310, a counter-fraud operation may be executed. The executing may occur with respect to a first set of data. The executing may occur using an initial set of parameter values for a set of parameters of the counter-fraud operation. At block 330, a set of user counter-fraud activities of a user may be monitored corresponding to a user interface. The monitoring may occur related to false-positive identification with respect to the first set of data. At block 350, a set of user feedback data may be captured. The capturing may occur based on the set of user counter-fraud activities which relates to false-positive identification of the user corresponding to the user interface with respect to the first set of data. The user feedback data may be captured to determine a feedback-driven set of parameter values for the set of parameters of the counter-fraud operation. At block 370, the feedback-driven set of parameter values for the set of parameters of the counter-fraud operation may be determined. The determining may occur based on the set of user feedback data. At block 390, the counter-fraud operation may be executed. The executing may occur with respect to a second set of data. The executing may occur using the feedback-driven set of parameter values for the set of parameters based on the set of user feedback data.

In embodiments, a set of user inputs may occur at block 331. It may be detected that the set of user counter-fraud activities of the user corresponding to the user interface includes a set of user inputs. Generally, detecting can include sensing, discovering, collecting, recognizing, or receiving. A set of user inputs may include selections (e.g., buttons pressed) or data values (e.g., scores, unstructured data such as comments) based on or as a result of user action. When the user closes an alert (e.g., false-positive identification) or opens a new case corresponding to the alert (e.g., true-positive identification), the feedback module may prompt the user to input a score (e.g., on a scale from 1 to 10) to obtain a confidence metric in the existing thresholds. A set of user input data which is based on the set of user inputs may be captured. The capturing may occur in the set of user feedback data as described herein. The set of user input data may include information learned from the set of user inputs. The feedback-driven set of parameter values for the set of parameters of the counter-fraud operation may be determined as described herein. The determining may occur based on the set of user input data in the set of user feedback data. The counter-fraud operation may be executed as described herein. The executing may occur with respect to the second set of data, wherein the second set of data may include the user input data. The executing may occur using the feedback-driven set of parameter values for the set of parameters based on the set of user input data in the set of user feedback data.

Consider the following example. An analyst may monitor a transaction which may include a fraud event (e.g., a fraudulent check). A set of user inputs may be detected based on the actions of the analyst. As an example, the analyst may add one short comment to the transaction before closing the alert (e.g., false-positive identification). The small number of comments (e.g., below a threshold number such as one) as well as the short length of the comment may result in the feedback module prompting the analyst for a confidence score. The analyst may be highly confident that the alert was a false-positive identification, and enter a confidence score of 2. The confidence score may be used to adjust the parameter values based on the set of user input data. The parameter values may be adjusted to filter-out more alerts with respect to fraudulent checks. As another example, the analyst may leave three longer comments (e.g., where the number of characters exceeds a threshold number of characters) and open a new case corresponding to the alert, indicating a true-positive identification. The analyst may input a confidence score of 9 (indicating that the transaction may include a fraud-event). The parameter values may not be adjusted, or may be adjusted to include more alerts with respect to fraudulent checks. Other examples of detecting a set of user inputs to determine the feedback-driven set of parameter values may also be possible.

In embodiments, a set of user-accessed modules may occur at block 332. It may be detected that the set of user counter-fraud activities of the user corresponding to the user interface includes a set of user-accessed modules. The set of user-accessed modules may include widgets based on user interaction or communication. A set of user-interaction module data which is based on the set of user-accessed modules may be captured. The capturing may occur in the set of user feedback data as described herein. The set of user-interaction module data may include information based on user interaction or communication. The feedback module may track the widgets (e.g., alert properties, related alerts) on the user interface which were accessed by the user. The feedback module may also track the content accessed within widgets (e.g., a transaction object in the related alerts widget). The feedback-driven set of parameter values for the set of parameters of the counter-fraud operation may be determined. The determining may occur based on the set of user-interaction module data in the set of user feedback data as described herein. As an example, if the alert was closed after the access of a widget, then the counter-fraud operation management engine may determine that the widget was useful in the user making the decision. Each widget may include a pre-assigned abstraction score representing the level of granularity the information content in the widget represents. The counter-fraud operation may be executed. The executing may occur with respect to the second set of data, wherein the second set of data may include the set of user-interaction module data. The executing may occur using the feedback-driven set of parameter values for the set of parameters based on the set of user-interaction module data in the set of user feedback data as described herein.

Consider the following example. An analyst may monitor a transaction which may include a fraud event (e.g., an ATM withdrawal of over 500). A set of user-accessed modules may be detected based on the interaction or communication of the analyst. As an example, the analyst may access a module for related alerts. The feedback module may track the access of the related alerts module, which may have a pre-assigned abstraction score representing the importance of the module to determining a false-positive fraud event. The related alerts module may be assigned an abstraction score of 3. The analyst may access an ATM withdrawal transaction widget within the related alerts module. The ATM withdrawal transaction widget may be assigned an abstraction score of 8. The abstraction scores may be used to adjust the parameter values. As an example, the ATM withdrawal transaction widget may indicate that the current parameters are relatively accurate at detecting a fraud event. The related alerts module may indicate a lower confidence in the parameter values and may result in an adjustment of the parameter values (e.g., include ATM withdrawal transactions of over 600). Other examples of detecting a set of user-accessed modules to determine the feedback-driven set of parameter values may also be possible.

In embodiments, a sequence of a set of user actions may occur at block 333. It may be detected that the set of user counter-fraud activities of the user corresponding to the user interface includes a sequence of a set of user actions. The sequence of a set of user actions may include the order in which certain actions may be performed (e.g., access widget A followed by accessing widget B followed by accessing widget C, access module A before sending a message to a supervisor, access widget C before closing a case). The sequence of a set of user actions may include pauses of actions or waiting for responses. A set of user action sequence data which is based on the sequence of the set of user actions may be captured. The capturing may occur in the set of user feedback data. The set of user action sequence data may include information based on the sequence of actions performed by the user. The feedback-driven set of parameter values for the set of parameters of the counter-fraud operation may be determined. The determining may occur based on the set of user action sequence data in the set of user feedback data. The counter-fraud operation may be executed. The executing may occur with respect to the second set of data, wherein the second set of data may include the user action sequence data. The executing may occur using the feedback-driven set of parameter values for the set of parameters based on the set of user action sequence data in the set of user feedback data.

Consider the following example. An analyst may monitor a transaction which includes a possible fraud event (e.g., twenty transactions in one day on one credit card). A sequence of a set of user actions may be detected based on the order in which certain actions are performed by the analyst. As an example, the analyst may access an alert properties module before immediately contacting a supervisor. The sequence and lack of a wait time may indicate a high confidence of a fraud event. The feedback-driven set of parameter values for the set of parameters may not be adjusted due to the true-positive identification. As another example, the analyst may access the alert properties module briefly before accessing the related alerts module briefly before closing the alert. The sequence of events leading to the false-positive identification may indicate a low confidence of an actual fraud event. The feedback-driven set of parameter values for the set of parameters may be adjusted accordingly. The threshold level of transactions (e.g., twenty) may be adjusted to alert analysts of activity which exceeds a higher threshold level of transactions (e.g., more than twenty-five transactions in one day on one credit card). Other methods of using a sequence of a set of user actions to determine the feedback-driven set of parameter values for the set of parameters may also be possible.

In embodiments, a set of temporal periods may occur at block 334. It may be detected that the set of user counter-fraud activities of the user corresponding to the user interface includes a set of temporal periods. The set of temporal periods may include the amount of time spent on or in between various selections, inputs, or the like. The set of temporal periods may include the amount of time from opening the case to closing the case, the amount of time a case is an active window, the amount of time a case is the only case open, the amount of time a case is open while multiple other cases are open, or the like. A set of temporal-oriented activity data which is based on a set of temporal periods may be captured. The set of temporal-oriented activity data may include information related to the amount of time spent on various actions. The capturing may occur in the set of user feedback data. As an example, a user may accept an alert and open a case. After a considerable amount of time (e.g., between 30 seconds and one minute), the user may determine an alert was a false-positive. The feedback-driven set of parameter values for the set of parameters of the counter-fraud operation may be determined. The determining may occur based on the set of temporal-oriented activity data in the set of user feedback data. The counter-fraud operation may be executed. The executing may occur with respect to the second set of data, wherein the second set of data may include the set of temporal-oriented activity data. The executing may occur using the feedback-driven set of parameter values for the set of parameters based on the set of temporal-oriented activity data in the set of user feedback data.

Consider the following example. An analyst may monitor a transaction which includes a possible fraud event (e.g., a transfer to a suspicious account). A set of temporal periods may be detected based on amounts of time related to the inspection of the analyst. As an example, an analyst may spend forty-five seconds after opening an alert determining an alert to be a false-positive and closing the case. The temporal period of forty-five seconds may exceed a threshold temporal period of ten seconds. The awarded confidence score may be low (e.g., 3) since the analyst spent a long time (compared to a threshold length of time) determining the false-positive. As another example, an analyst may spend two seconds with an alert as the active window before determining the alert to be a false-positive identification and closing the case. The temporal period of two seconds may not exceed the threshold temporal period of ten seconds. The awarded confidence score may be high (e.g., 10) since the analyst had the alert as the primary active window for a short length of time. The parameters may be adjusted accordingly. Transfers to the suspicious account in question may be more frequently filtered-out (e.g., less alerts) based on the temporal-oriented activity of the analyst. Other methods of detecting temporal-oriented activity to determine the feedback-driven set of parameter values for the set of parameters may also occur.

In embodiments, a set of confidence scores may occur at block 356. A set of confidence scores may be ascertained. Generally, ascertaining can include determining, resolving, computing, formulating, analyzing, identifying, or evaluating. The set of confidence scores may include a group of values or ratings (e.g., f_1) which may indicate the level of certainty that an alert was a false-positive. The ascertaining may occur based on the set of user feedback data. The set of confidence scores may be received from the user or computed automatically. The set of confidence scores may include values based on one or more of the various types of user feedback data described herein. As an example, if a user accepts an alert and opens a case, the confidence score may be high (e.g., 9, 10). If a user spends a considerable amount of time (e.g., 30 seconds, 60 seconds) before deducing an alert was a false-positive, then the confidence score may be moderate (e.g., 6, 7, 8). If the user quickly (e.g., within 10 seconds) inspects an alert and closes the alert, then the confidence score may be low (e.g., 1, 2, 3, 4, 5). The set of confidence scores may also be determined based on a set of user inputs (e.g., number of text comments entered by a user where several lengthy comments typed by the user may indicate a moderate or low confidence score), a set of user-accessed modules (e.g., the module chosen where a specific module may indicate a high confidence score), a sequence of a set of user actions (e.g., opening a case and immediately contacting a supervisor may indicate a high confidence score), or other user feedback data (e.g., the experience of the user where a more experienced analyst may indicate a high confidence score). The set of confidence scores may pertain to the set of user counter-fraud activities related to false-positive identification with respect to the first set of data.

The feedback-driven set of parameter values for the set of parameters of the counter-fraud operation may be determined as described herein. The determining may occur based on the set of confidence scores which pertains to the set of user counter-fraud activities related to false-positive identification with respect to the first set of data. The counter-fraud operation may be executed as described herein. The executing may occur with respect to the second set of data, wherein the second set of data may include the set of confidence scores. The executing may occur using the feedback-driven set of parameter values for the set of parameters based on the set of confidence scores.

Consider the following example. An analyst may receive an alert for a possible fraud event (e.g., an international transaction). A set of user feedback data may be captured to ascertain a set of confidence scores (f_1). The set of confidence scores may be ascertained based on a set of user inputs. As an example, the analyst may assign a confidence score of 9 for an international transaction which they believe to be a true-positive identification. The set of confidence scores may be ascertained based on a set of user-accessed modules. As an example, the analyst may open a widget to contact a supervisor. The contact supervisor widget may have a pre-assigned confidence score of 8, indicating that there is a high confidence that fraud is present in the international transaction. The set of confidence scores may be ascertained based on a sequence of a set of user actions. As an example, the analyst may open a related alerts module and then a contact supervisor module. The sequence of accessed modules may indicate a high confidence (e.g., 9) of a fraud event. The set of confidence scores may be ascertained based on a set of temporal periods. The analyst may inspect the alert for twenty seconds before determining a false-positive and closing the alert. A moderate confidence score (e.g., 5) may be awarded due to the considerable amount of time spent by the analyst determining a false-positive identification. The feedback-driven set of parameter values for the set of parameters may be determined based on the set of confidence scores. The high confidence scores (e.g., 8, 9) may indicate no change should be made to the parameter values. The moderate confidence score (e.g., 5) may indicate a slight change should be made to the parameter values. The parameter values should be increased slightly based on a small f_1 value to reduce the overall rate of false-positive identifications. Other methods of ascertaining a set of confidence scores may also be possible.

Method 300 concludes at block 399. Aspects of method 300 may provide performance or efficiency benefits related to counter-fraud operation management. Aspects may save resources such as bandwidth, processing, or memory. As an example, memory may be saved by using confidence scores to execute the counter-fraud operation. The use of confidence scores to alter the parameter values may allow for more accurate parameter values which provide a smaller amount of false-positive alerts to the user. This may allow for the use of a smaller amount of memory since a smaller amount of alerts may be provided to the user. Other examples of saving memory may also be possible.

Figure 4:
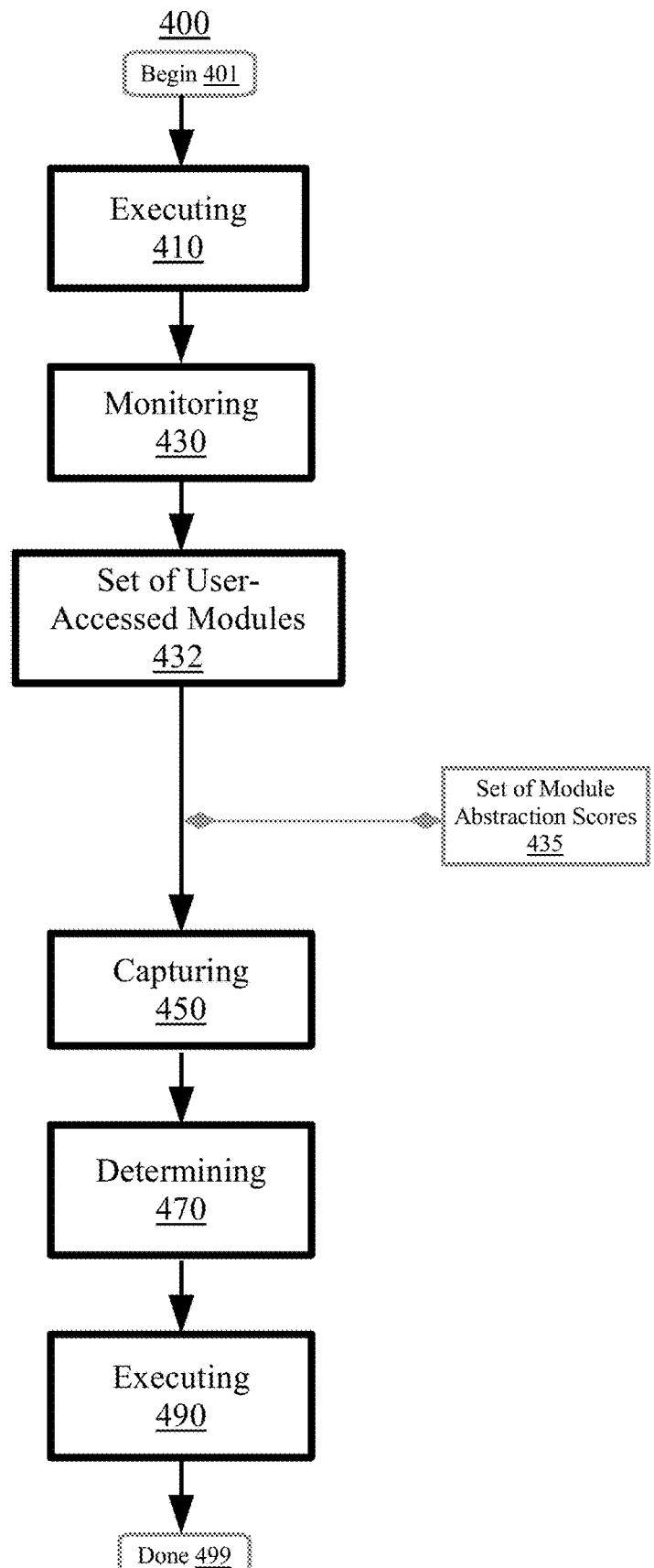
FIG. 4 is a flowchart illustrating a method of counter-fraud operation management, according to embodiments.

FIG. 4 is a flowchart illustrating a method 400 of counter-fraud operation management. Aspects of method 400 may be similar or the same as aspects of method 200/300, and aspects may be utilized interchangeably with one or more methodologies described herein. The method 400 may begin at block 401. At block 410, a counter-fraud operation may be executed. The executing may occur with respect to a first set of data. The executing may occur using an initial set of parameter values for a set of parameters of the counter-fraud operation. At block 430, a set of user counter-fraud activities of a user may be monitored corresponding to a user interface. The monitoring may occur related to false-positive identification with respect to the first set of data. At block 450, a set of user feedback data may be captured. The capturing may occur based on the set of user counter-fraud activities which relates to false-positive identification of the user corresponding to the user interface with respect to the first set of data. The user feedback data may be captured to determine a feedback-driven set of parameter values for the set of parameters of the counter-fraud operation. At block 470, the feedback-driven set of parameter values for the set of parameters of the counter-fraud operation may be determined. The determining may occur based on the set of user feedback data. At block 490, the counter-fraud operation may be executed. The executing may occur with respect to a second set of data. The executing may occur using the feedback-driven set of parameter values for the set of parameters based on the set of user feedback data.

At block 432, a set of user-accessed modules may occur as described herein. It may be detected that the set of user counter-fraud activities of the user corresponding to the user interface includes a set of user-accessed modules. A set of user-interaction module data which is based on the set of user-accessed modules may be captured. The capturing may occur in the set of user feedback data. The feedback-driven set of parameter values for the set of parameters of the counter-fraud operation may be determined. The determining may occur based on the set of user-interaction module data in the set of user feedback data. The counter-fraud operation may be executed. The executing may occur with respect to the second set of data. The executing may occur using the feedback-driven set of parameter values for the set of parameters based on the set of user-interaction module data in the set of user feedback data.

In embodiments, a set of module abstraction scores may be computed at block 435. Generally, computing can include determining, resolving, formulating, identifying, evaluating, or ascertaining. The set of module abstraction scores (e.g., f_2) may include a group of values or ratings which may indicate the level of certainty that a specific part of an alert detail prompted the user to decide the alert was a false-positive identification. The computing may occur based on the set of user-interaction module data in the set of user feedback data. The set of module abstraction scores may pertain to the set of user-accessed modules of the set of user counter-fraud activities related to false-positive identification with respect to the first set of data. Each widget may include a pre-assigned abstraction score which represents the level of granularity the information content in that widget represents. As an example, on a scale from 1 through 10, the core properties of an alert may have a low abstraction score (e.g., 2, 3), while the properties of the objects that the alert contains may have a high abstraction score (e.g., 8, 9). The individual scores for accessed widgets for a particular alert may be summed to compute a cumulative score. The feedback-driven set of parameter values for the set of parameters of the counter-fraud operation may be determined as described herein. The determining may occur based on the set of module abstraction scores which pertains to the set of user counter-fraud activities related to false-identification with respect to the first set of data. The counter-fraud operation may be executed as described herein. The executing may occur with respect to the second set of data, wherein the second set of data may include the module abstraction scores. The executing may occur using the feedback-driven set of parameter values for the set of parameters based on the set of module abstraction scores.

Consider the following example. An analyst may be provided with an alert regarding a possible fraud event (e.g., excessive cash withdrawal from a savings account). A set of module abstraction scores, f_2, may be computed based on the collected set of user-interaction module data. As an example, the opening of the related alerts widget may prompt the analyst to decide the alert is a false-positive identification. The action performed by the analyst may have a low abstraction score (e.g., 2). The analyst may also open the alert properties widget with an abstraction score of 8. The access of several widgets may be very likely to prompt the analyst to decide the alert is a false-positive identification. The sequence of actions performed by the analyst may have a high abstraction score (e.g., 10). The abstraction score f_2 may determine the feedback-driven set of parameter values for the set of parameters. A low abstraction score may result in a change in parameter values since the analyst was easily able to identify a false-positive after opening only one module. Other examples of computing a set of module abstraction scores may also be possible.

Method 400 concludes at block 499. Aspects of method 400 may provide performance or efficiency benefits related to counter-fraud operation management. Aspects may save resources such as bandwidth, processing, or memory. As an example, computing a set of module abstraction scores may result in lower bandwidth usage. The set of module abstraction scores may adjust the parameter values to reduce the overall number of false-positive alerts presented to the user. A lower number of false-positive alerts may require usage of less bandwidth. Other examples of saving bandwidth using a set of module abstraction scores may also be possible.

Figure 5:
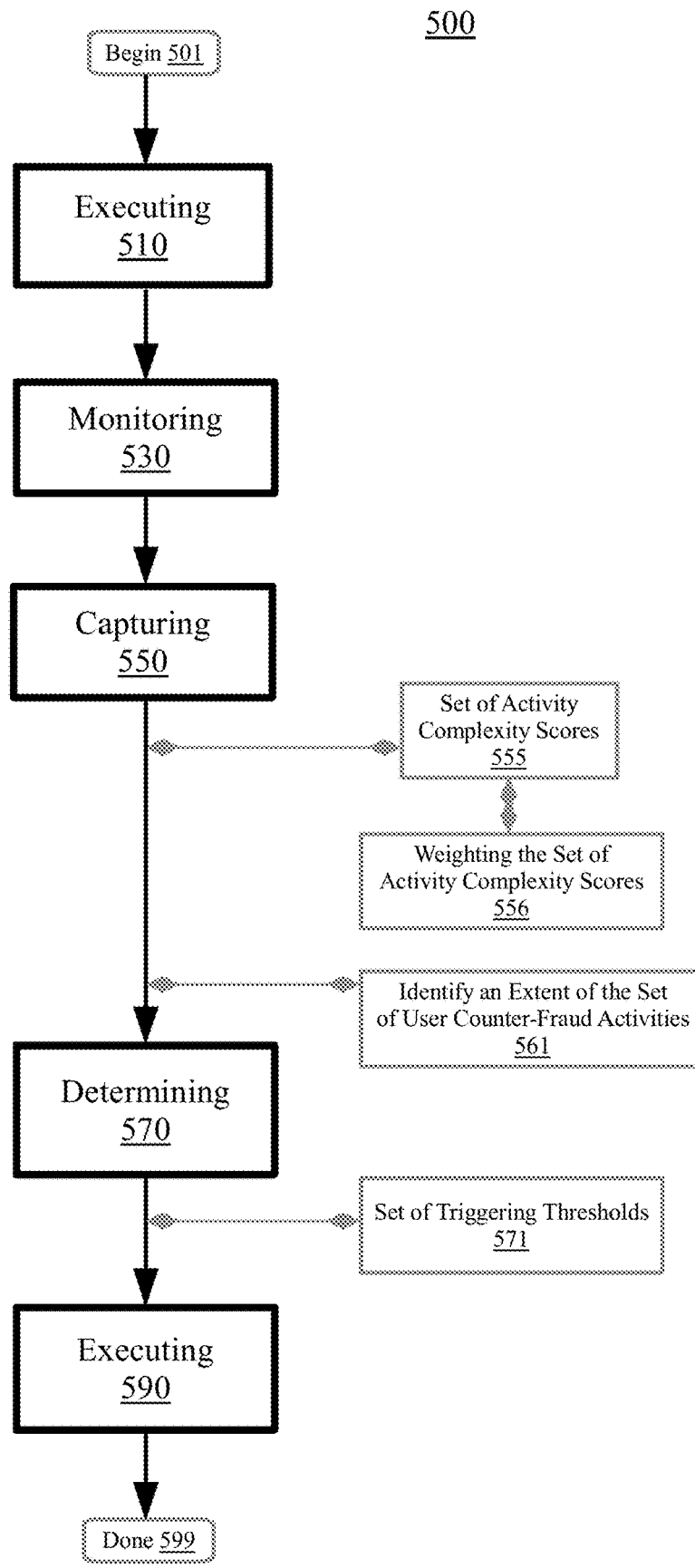
FIG. 5 is a flowchart illustrating a method of counter-fraud operation management, according to embodiments.

FIG. 5 is a flowchart illustrating a method 500 of counter-fraud operation management. Aspects of method 500 may be similar or the same as aspects of method 200/300/400, and aspects may be utilized interchangeably with one or more methodologies described herein. The method 500 may begin at block 501. At block 510, a counter-fraud operation may be executed. The executing may occur with respect to a first set of data. The executing may occur using an initial set of parameter values for a set of parameters of the counter-fraud operation. At block 530, a set of user counter-fraud activities of a user may be monitored corresponding to a user interface. The monitoring may occur related to false-positive identification with respect to the first set of data. At block 550, a set of user feedback data may be captured. The capturing may occur based on the set of user counter-fraud activities which relates to false-positive identification of the user corresponding to the user interface with respect to the first set of data. The user feedback data may be captured to determine a feedback-driven set of parameter values for the set of parameters of the counter-fraud operation. At block 570, the feedback-driven set of parameter values for the set of parameters of the counter-fraud operation may be determined. The determining may occur based on the set of user feedback data. At block 590, the counter-fraud operation may be executed. The executing may occur with respect to a second set of data. The executing may occur using the feedback-driven set of parameter values for the set of parameters based on the set of user feedback data.

In embodiments, a set of activity complexity scores may be computed at block 555. Generally, computing can include determining, resolving, formulating, analyzing, identifying, evaluating, or ascertaining. The set of activity complexity scores may include a numerical value assigned to an activity which may indicate the degree of interaction between the user and the widget. The computing may occur based on the set of user feedback data, which may include one or more of the various types of user feedback data described herein. The set of activity complexity scores may pertain to the set of user counter-fraud activities (e.g., user inputs, contents accessed in modules/widgets) related to false-positive identification with respect to the first set of data. The feedback module may track the content accessed within the widgets within the context of a certain alert. As an example, a widget may be accessed to view related objects to view a transaction object within the context of an alert. The user interface for viewing a graph G (e.g., of interconnected objects such as individuals, organizations, accounts, transactions) may be expanded. The module may assign a complexity score depending on the degree of interaction. The feedback-driven set of parameter values for the set of parameters of the counter-fraud operation may be determined as described herein. The determining may occur based on the set of activity complexity scores which pertains to the set of user counter-fraud activities related to false-positive identification with respect to the first set of data. The counter-fraud operation may be executed as described herein. The executing may occur with respect to the second set of data, wherein the second set of data may include the set of activity complexity scores. The executing may occur using the feedback-driven set of parameter values for the set of parameters based on the set of activity complexity scores.

In embodiments, the set of activity complexity scores may be weighted at block 556. Weighting can include adjusting, increasing, decreasing, modifying, or transforming figures, scores, or numerical values to reflect a level of importance (e.g., by value, by proportion). The activity complexity scores of each widget may be weighted based on the degree of interaction and level of importance of the interaction between the user and widget. As an example, a widget which contacts the supervisor of a user may be considered an important interaction. If the user accesses that widget, the set of activity complexity scores may be heavily weighted (e.g., awarded a value of 9). The weighting may occur using a set of module abstraction scores which pertains to a set of user-accessed modules of the set of user counter-fraud activities related to false-positive identification with respect to the first set of data. Widgets with important or frequent interactions may receive a high weighted score. The weighted activity complexity scores of each widget may be combined for a third cumulative score (e.g., f_3).

Consider the following example. An analyst may be presented with an alert indicating a possible fraud event (e.g., a potentially illegal transaction). A set of activity complexity scores may be computed based on the set of user feedback data. As an example, an analyst may open the alert properties module and determine a false-positive identification. The opening of one module may be awarded a low activity complexity score (e.g., 3). The analyst may open several (e.g., four) widgets within the alert properties module, such as similar transactions, previous transactions, transaction amounts, and the like. The opening of four widgets within a module may be awarded a high activity complexity score (e.g., 8) since several widgets were used in the determination of a false positive (e.g., a higher degree of interaction with the module). The set of activity complexity scores may be used to determine the feedback-driven set of parameter values. A high activity complexity score may indicate that the analyst had difficulty determining a false-positive, and no adjustments to the parameter values may be made. A low activity complexity score may indicate that the analyst had no difficulty determining a false-positive, and adjustments may be made to the parameter values accordingly. The set of activity complexity scores may also be weighted, adjusted, or modified to reflect a level of important of the interaction. As an example, the one module opened which was awarded an activity complexity score of 3 may have included the module to contact the supervisor of the analyst. This particular module may be weighted such that all activity complexity scores may be increased by 2. The opening of the one module (e.g., contact supervisor) may now receive an activity complexity score of 5, while the opening of the one module as well as several widgets in the module may receive an activity complexity score of 10. The weighted activity complexity score may be considered $f\_3$ and may be used to adjust the parameter values accordingly. Other examples of computing and weighting an activity complexity score may also occur.

In embodiments, both a false-positive and an extent of the set of user counter-fraud activities may occur at block 561. It may be identified that the set of user feedback data indicates both a false-positive for the first set of data and an extent of the set of user counter-fraud activities which correlates to the false-positive. Generally, identifying can include sensing, recognizing, detecting, ascertaining, or determining. The user feedback data may include both a false-positive identification and an extent of the set of user counter-fraud activities (e.g., the amount of work the user performed). If the alert was a false positive, the overall score may adjust in line with the extent of work the user performed before closing the alert. As an example, if the user performed a small amount of work to determine that the alert is a false-positive, then the threshold may be increased. If the user performed a larger amount of work to determine that the alert is a false-positive, then the threshold may not be increased as much or may not be changed at all. For true positives, the threshold may not be adjusted. The feedback-driven set of parameter values for the set of parameters of the counter-fraud operation may be resolved. Generally, resolving can include determining, computing, formulating, analyzing, identifying, evaluating, or ascertaining. The resolving may occur based on the extent of the set of user counter-fraud activities which correlates to the false-positive. The parameter values may increase or decrease threshold values which trigger reviews so as to have fewer false-positive identifications (e.g., particularly reviews that did not have a large extent of work for the analyst).

Consider the following example. A cumulative overall score for a possible fraud event may be calculated as described herein. An alert may include a possible fraud event related to excessive card activity (e.g., twelve transactions in two hours). The alert may be awarded a confidence score ($f\_1$) of 3. The analyst may dismiss the alert as a false-positive. The alert may be awarded a module abstraction score ($f\_2$) of 5. The widget accessed by the analyst may use mainly core properties as well as a few properties of alert objects to determine that the alert is a false-positive identification. The alert may be awarded a weighted activity complexity score ($f\_3$) of 6. The analyst may use several widgets within particular modules to determine an alert as a false-positive identification. The set of user feedback data indicates a false positive, as well as a cumulative overall score as the extent of the set of user counter-fraud activities which correlates to the false-positive. The cumulative overall score may be utilized to scale the extent to which the parameter values should be adjusted. As an example, a formula to account for this may include $F\_false\_neg = (k*3*5-c*6)$ where k and c are pre-defined constants such as $k=10$ and $c=20$. $F\_false\_neg=10*3*5-20*6=30$. The parameter values may be adjusted accordingly based on the formula. Other methods of identifying that the set of user feedback data indicates both a false-positive and an extent of the set of user counter-fraud activities which correlates to the false-positive may also be possible.

In embodiments, the feedback-driven set of parameter values may be configured at block 571. Generally, configuring may include setting-up, programming, adjusting, instructing, revising, or modifying. The configuring may occur for the set of parameters to include a set of triggering thresholds for the set of parameters of the counter-fraud operation. The set of triggering thresholds may include a benchmark value, range, length of time, percentage, or the like which indicates a characteristic of the set of parameters of the counter-fraud operation. An alert may be provided. Providing can include presenting or displaying an alert to the user. The alert may include an audio alert, a text alert, an alert in the user interface (e.g., the graphical user interface), or other types of alerts. The providing may occur in response to an achievement (by a set of data being operated on/analyzed) of the set of triggering thresholds. When a benchmark value is reached, the triggering threshold may indicate that an alert should be provided to the user. In certain embodiments, a class (e.g., fraud assessment value) may be used instead of a threshold comparison. The classes (e.g., high, medium, low) may imply a threshold range. A score may belong to a class if the scores falls in the associated threshold range.

Consider the following example. The feedback-driven set of parameter values may be configured to include a set of triggering thresholds for the set of parameters. The set of parameters may include a benchmark value of 6 for $f\_1$, a benchmark range from 4-7 for $f\_2$, and a benchmark value of 8 for $f\_3$. These triggering thresholds may be compared with the feedback-driven set of parameter values. The $f\_1$ value for an ATM withdrawal fraud event may be calculated as 4. The $f\_1$ value may not exceed the triggering threshold. An alert may not be provided to the analyst. The $f\_3$ value for an international transaction may be computed as 9. The $f\_3$ value exceeds the triggering threshold, and an alert may be provided to the analyst in response to the achievement of the triggering threshold. The $f\_2$ value for a suspicious transfer may be computed as 6. The $f\_2$ value may fall in the $f\_2$ threshold range. The $f\_2$ value may be classified with a fraud assessment value of "medium." An alert may be provided to the analyst. Other examples of including a set of triggering thresholds to provide an alert may also occur.

Method 500 concludes at block 599. Aspects of method 500 may provide performance or efficiency benefits related to counter-fraud operation management. Aspects may save resources such as bandwidth, processing, or memory. As an example, configuring to include a set of triggering thresholds may save processing time. When an achievement of the set of triggering thresholds occurs, an alert may be provided to the user to indicate a possible fraud event. This may prevent the user or the system from processing all fraud events. The user or system may only process fraud events which achieve the triggering threshold. This may save processing time. Other examples of saving processing time may also be possible.

Figure 6:
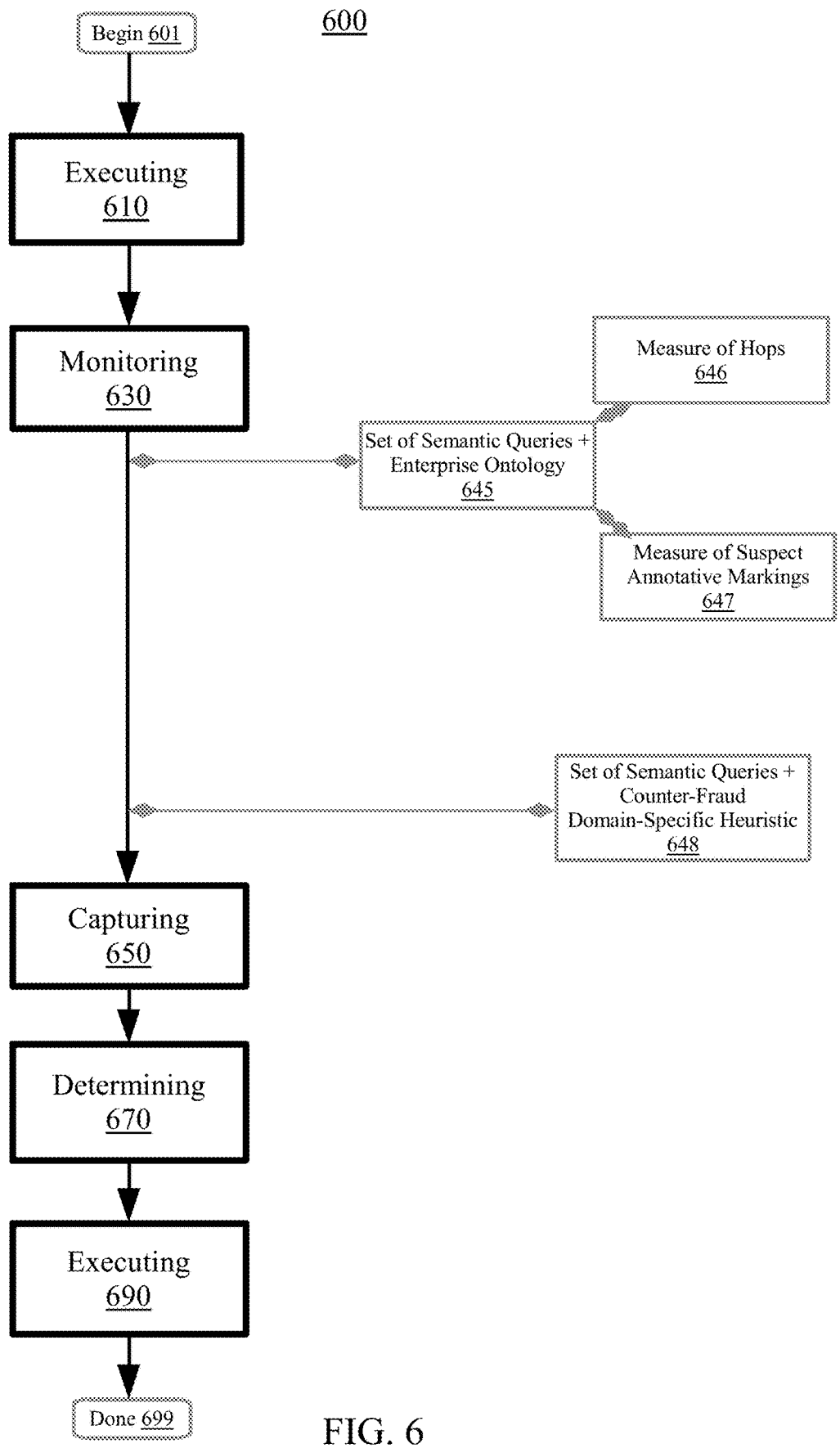
FIG. 6 is a flowchart illustrating a method of counter-fraud operation management, according to embodiments.

FIG. 6 is a flowchart illustrating a method 600 of counter-fraud operation management. Aspects of method 600 may be similar or the same as aspects of method 200/300/400/500, and aspects may be utilized interchangeably with one or more methodologies described herein. The method 600 may begin at block 601. At block 610, a counter-fraud operation may be executed. The executing may occur with respect to a first set of data. The executing may occur using an initial set of parameter values for a set of parameters of the counter-fraud operation. At block 630, a set of user counter-fraud activities of a user may be monitored corresponding to a user interface. The monitoring may occur related to false-positive identification with respect to the first set of data. At block 650, a set of user feedback data may be captured. The capturing may occur based on the set of user counter-fraud activities which relates to false-positive identification of the user corresponding to the user interface with respect to the first set of data. The user feedback data may be captured to determine a feedback-driven set of parameter values for the set of parameters of the counter-fraud operation. At block 670, the feedback-driven set of parameter values for the set of parameters of the counter-fraud operation may be determined. The determining may occur based on the set of user feedback data. At block 690, the counter-fraud operation may be executed. The executing may occur with respect to a second set of data. The executing may occur using the feedback-driven set of parameter values for the set of parameters based on the set of user feedback data.

In embodiments, a set of fraud-indicative objects may be collected at block 645. Generally, collecting can include detecting, sensing, discovering, recognizing, or receiving. The set of fraud-indicative objects may include one or more features of a data structure which indicates transactions, accounts, parties, or the like which specify or include fraud. The objects may be collected from the first set of data. Each potential alert may include properties passed by the user, including a property to capture the related objects (e.g., transactions, accounts, parties) associated with the potential alert. A set of semantic queries may be performed. The set of semantic queries may include relational operations which utilize features such as operators, namespaces, pattern matching, subclassing, semantic rules, and the like. The performing may occur using an enterprise ontology. The enterprise ontology may include the development of organizational models on a high-level of abstraction. The set of semantic queries may be performed on the set of fraud-indicative objects. The actions layer may leverage a graph and the schema or ontology of the graph to perform semantic queries (e.g., SPARQL) starting from each of the objects in the set of related objects. Semantic queries may follow a pattern-matching paradigm where node annotations may be used to specify which nodes to include in the query results. A set of fraud-indicative relationships may be determined. Generally, determining can include resolving, computing, formulating, analyzing, identifying, evaluating, or ascertaining. The determining may occur based on the set of semantic queries on the set of fraud-indicative objects. The determining may occur using a set of ontology annotation data. Negative annotations may be used to determine fraud-indicative objects. The negative annotations may include nodes which have been blacklisted (e.g., a node representing a party that was put on a watchlist multiple times), marked as ML (e.g., a node representing a transaction that participated in a money-laundering activity), illegal (e.g., a node representing an illegal transaction), marked as CF_Violation (e.g., a node representing an account that was marked for check fraud violation), or the like. The feedback-driven set of parameter values for the set of parameters of the counter-fraud operation may be overridden (e.g., ignored, bypassed). The overriding may occur based on the set of fraud-indicative relationships determined using the set of ontology annotation data.

In embodiments, a measure of hops may be calculated at block 646. Generally, calculating can include computing, formulating, estimating, deriving, or ascertaining. The measure of hops may include a number, quantity, value, or amount from the pivot node. The measure of hops may be calculated with respect to the set of fraud indicative-objects. The calculating may occur to determine the set of fraud-indicative relationships using the set of ontology annotation data. The measure of hops may be compared with a threshold hop benchmark. Generally, comparing can include examining, assessing, or evaluating. The threshold hop benchmark may include a predetermined value, number, quantity, or amount from the pivot node. The feedback-driven set of parameter values for the set of parameters of the counter-fraud operation may be overridden to provide an alert. The overriding may occur in response to the threshold hop benchmark exceeding the measure of hops. If the threshold hop benchmark exceeds the measure of hops, the counter-fraud operation may be bypassed. A search may use a spread of a certain path length (e.g., t=1) and gradually increments the path length until reaching a predetermined graph constant (e.g., t=t_max). The greater number of hops from the pivot node, the weaker the fraud-indicative relationship. If the number of hops does not exceed the threshold, there may be evidence of a fraud-indicative relationship. An alert may be provided to the user.

Consider the following example. A set of fraud indicative objects may be collected from a transaction which may contain a fraud event. A potential alert may be formulated for the transaction. Related objects may be captured associated with the potential alert. As an example, a possible fraudulent transaction may be analyzed with respect to the parties involved or the accounts of the parties involved. A graph G of interconnected objects, such as the individuals involved and their account information, may be leveraged to perform semantic queries (e.g., SPARQL) starting from the objects in the set of related objects. The semantic queries may be utilized to select a specific individual, a specific transaction, or the like. The semantic queries may be utilized to construct the graph or extract a Resource Description Framework (RDF) graph from the SPARQL endpoints. The semantic queries may utilize a pattern-matching paradigm where node annotations may be used to specify which nodes or paths to include in the query results. A fraud-indicative relationship may be established based on the number of hops in the returned path. A spread of path length t may be compared to a predetermined threshold number of hops. As an example, the measured number of hops may be equal to 8 (e.g., 8 hops from the current node to the fraud-indicative node/object). A predetermined threshold number of hops may be equal to 10. The measured number of hops may not exceed the threshold, indicating a stronger fraud-indicative relationship. An alert may be provided to the user based on the number of hops. The measured number of hops may be equal to 12. The measured number of hops may exceed the threshold, indicating a weaker fraud-indicative relationship. An alert may not be provided to the analyst since it is likely a false-positive identification. Other methods of using a number of hops to identify a fraud-indicative relationship may also be possible.

In embodiments, a measure of suspect annotative markings may be calculated at bock 647. Generally, calculating can include computing, formulating, estimating, deriving, or ascertaining. The suspect annotative markings (e.g., negatively annotated nodes) may include negative annotations that can be utilized to determine fraud-indicative relationships as described herein. The calculating may occur with respect to the set of fraud-indicative objects. The calculating may occur to determine the set of fraud-indicative relationships using the set of ontology annotation data. The measure of suspect annotative markings may be compared with a threshold suspect marking benchmark. Generally, comparing can include examining, assessing, or evaluating. The threshold suspect marking benchmark may include a predetermined value, number, quantity, or amount of suspect markings. The feedback-driven set of parameter values for the set of parameters of the counter-fraud operation may be overridden to provide an alert. The overriding may occur in response to the measure of suspect annotative markings exceeding the threshold suspect marking benchmark. If the measure of suspect annotative markings exceeds the threshold suspect marking benchmark, the counter-fraud operation may be bypassed. The greater the number of negatively annotated nodes, the stronger the fraud-indicative relationship. If the number of suspect annotative markings exceeds the threshold suspect marking benchmark, there may be evidence of a fraud-indicative relationship. An alert may be provided to the user.

Consider the following example. A set of fraud indicative objects may be collected from a transaction which may contain a fraud event. A potential alert may be formulated for the transaction. Related objects may be captured associated with the potential alert. As an example, a possible fraudulent transaction may be analyzed with respect to the parties involved or the accounts of the parties involved. A graph G of interconnected objects, such as the individuals involved and their account information, may be leveraged to perform semantic queries (e.g., SPARQL) starting from the objects in the set of related objects. The semantic queries may be utilized to select a specific individual, a specific transaction, or the like. The semantic queries may be utilized to construct the graph or extract a RDF graph from the SPARQL endpoints. The semantic queries may utilize a pattern-matching paradigm where node annotations may be used to specify which nodes or paths to include in the query results. Various suspect annotative markings may be utilized to determine fraud-indicative relationships. As an example, one of the parties involved in the transaction may have been blacklisted (e.g., a suspect annotative marking of Blacklisted). The node representing this party may have been put on multiple watch-lists for fraudulent transactions. Another party involved in the transaction may be flagged for check fraud violation, which may be indicated with a suspect annotative marking of CF_Violation. The number of suspect annotative markings in this example may equal 2. The number of suspect annotative markings may be compared with a threshold number of suspect annotative markings (e.g., 5). The number of suspect annotative markings may not exceed the threshold number of suspect annotative markings, indicating a weaker fraud-indicative relationship. An alert may not be provided to the analyst since the fraud-indicative object is likely a false-positive based on the threshold level of suspect annotative markings. The number of suspect annotative markings in another example may be equal to 10. The number of suspect annotative markings may exceed the threshold number of suspect annotative markings (e.g., 5), indicating a stronger fraud-indicative relationship. An alert may be provided to the analyst since the fraud-indicative object is likely a true-positive based on the threshold level of suspect annotative markings. Other examples of using a number of suspect annotative markings to identify a fraud-indicative relationship may also be possible.

In embodiments, a set of semantic queries may be performed at block 648. Generally, performing can include processing, resolving, carrying-out, or executing. The performing may occur with respect to a semantic framework. The semantic framework may include the use of semantic (e.g., relating to meaning in language) technologies to combine existing software with additional components to provide a complete application framework. The performing may occur using a counter-fraud domain-specific heuristic. The counter-fraud domain-specific heuristic may include a process or method to detect and counter instances of fraud. A set of candidate relationships may be identified. Generally, identifying can include sensing, recognizing, detecting, ascertaining, or determining. The set of candidate relationships may include a group of relationships which are considered appropriate for the set of semantic queries. The identifying may occur based on a set of pivot nodes derived from performance of the set of semantic queries with respect to the semantic framework. The set of feedback-driven parameter values for the set of parameters may be modified. Generally, modifying can include configuring, adjusting or revising. The modifying may occur based on the set of candidate relationships.

Consider the following example. A set of semantic queries may be performed with respect to a counter-fraud domain-specific heuristic. A graph G of interconnected objects, such as the individuals involved and their account information, may be leveraged to perform semantic queries (e.g., SPARQL) starting from the objects in the set of related objects. The semantic queries may be utilized to select a specific individual, a specific transaction, or the like. The semantic queries may be utilized to construct the graph or extract a RDF graph from the SPARQL endpoints. A set of candidate relationships may be identified based on the set of pivot nodes from graph G. The set of candidate relationships may indicate an acceptable threshold number of hops (e.g., 4) and an acceptable threshold number of suspect annotative markings (e.g., 5) for the transaction. The actual relationship may be compared to the set of candidate relationships. The actual number of hops may be equal to 7 and the actual number of suspect annotative markings may be equal to 2. The number of hops and number of suspect annotative markings indicate a weaker fraud-indicative relationship. The transaction may not contain a case of fraud (e.g., a false-positive identification). The set of feedback-driven parameters may be modified in response to this. The parameters may be modified to allow for a fewer number of false-positive identifications to be presented to the analyst as an alert. Other examples of identifying a set of candidate relationships to modify the set of feedback-driven parameter values may also be possible.

Method 600 concludes at block 699. Aspects of method 600 may provide performance or efficiency benefits related to counter-fraud operation management. Aspects may save resources such as bandwidth, processing, or memory. As an example, processing time may be saved through the use of semantic queries to identify fraud-indicative relationships. A measure of suspect annotative markings may be calculated and compared to a threshold. If the measure of suspect annotative markings does not exceed the threshold, an alert may not be provided to the user as it is likely a false-positive. In this way, false-positive identifications may be filtered-out and not presented to the user for triage. This may save processing time. Other methods of saving processing time may also be possible.

Figure 7:
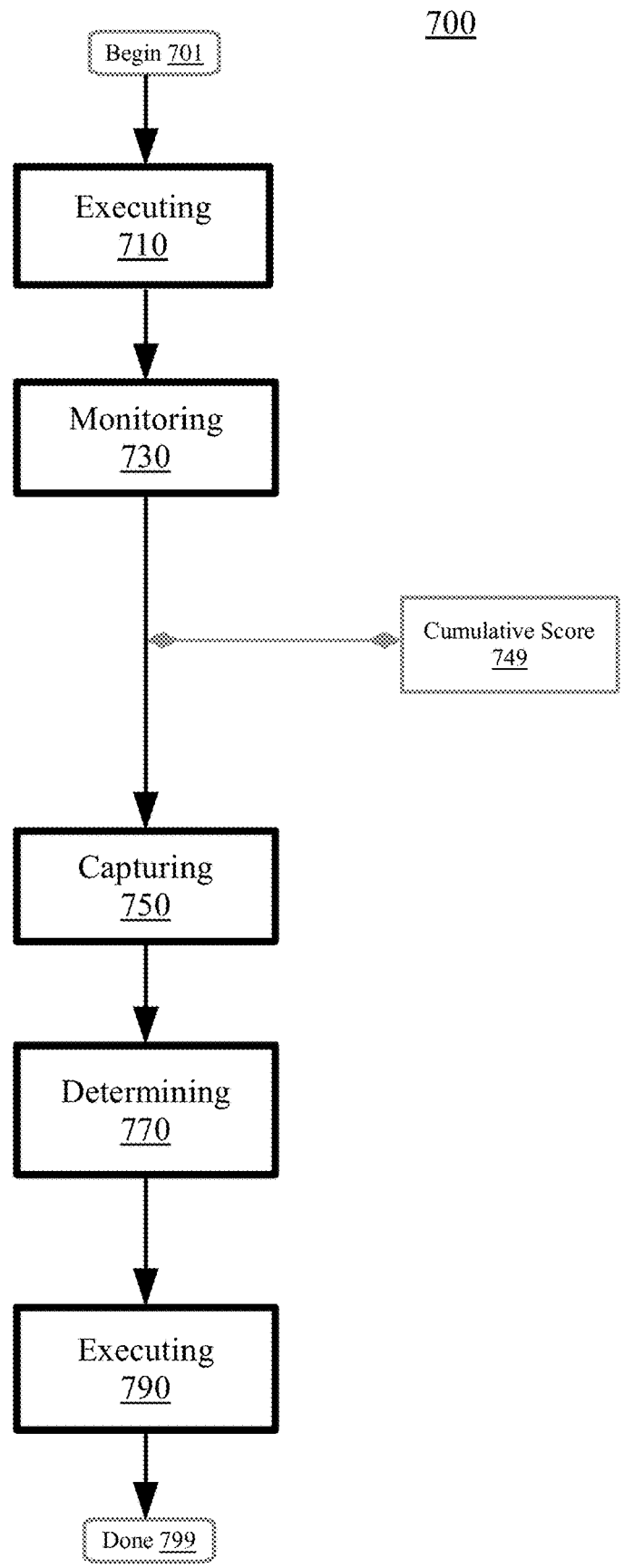
FIG. 7 is a flowchart illustrating a method of counter-fraud operation management, according to embodiments.

FIG. 7 is a flowchart illustrating a method 700 of counter-fraud operation management. Aspects of method 700 may be similar or the same as aspects of method 200/300/400/500/600, and aspects may be utilized interchangeably with one or more methodologies described herein. The method 700 may begin at block 701. At block 710, a counter-fraud operation may be executed. The executing may occur with respect to a first set of data. The executing may occur using an initial set of parameter values for a set of parameters of the counter-fraud operation. At block 730, a set of user counter-fraud activities of a user may be monitored corresponding to a user interface. The monitoring may occur related to false-positive identification with respect to the first set of data. At block 750, a set of user feedback data may be captured. The capturing may occur based on the set of user counter-fraud activities which relates to false-positive identification of the user corresponding to the user interface with respect to the first set of data. The user feedback data may be captured to determine a feedback-driven set of parameter values for the set of parameters of the counter-fraud operation. At block 770, the feedback-driven set of parameter values for the set of parameters of the counter-fraud operation may be determined. The determining may occur based on the set of user feedback data. At block 790, the counter-fraud operation may be executed. The executing may occur with respect to a second set of data. The executing may occur using the feedback-driven set of parameter values for the set of parameters based on the set of user feedback data.

In embodiments, a cumulative score may be formulated based on the first set of data at block 749. Generally, formulating can include constructing, establishing, computing, or determining a cumulative score using aspects which appear herein. The cumulative score may include a weighted value for an alert based on a set of data. The cumulative score may be based on a set of user input data which is based on a set of user inputs, a set of user-interaction module data which is based on a set of user-accessed modules, a set of user action sequence data which is based on a sequence of the set of user actions, a set of temporal-oriented activity data which is based on a set of temporal periods related to the set of user counter-fraud activities, a set of confidence scores which pertains to the set of user counter-fraud activities related to false-positive identification with respect to the first set of data, a set of module abstraction scores which pertains to the set of user-accessed modules of the set of user counter-fraud activities related to false-positive identification with respect to the first set of data, or a set of activity complexity scores which pertains to the set of user counter-fraud activities related to false-positive identification with respect to the first set of data (as described herein). The cumulative score may include the scores described herein (e.g., $f\_1$, $f\_2$, $f\_3$). The cumulative score may be compared with a threshold overall score. Generally, comparing can include examining, assessing, or evaluating. The threshold overall score may include a predefined benchmark value for the overall score of an alert. The counter-fraud operation may be modified. Generally, modifying can include programming, adjusting, or revising. The modification may occur in response to the cumulative score achieving the threshold overall score. If the alert was a false positive, the overall score may adjust the threshold in line with the extent of work performed by the user. The threshold may be increased if the user easily determined a false-positive and the threshold may be decreased if the user had difficulty determining a false-positive. The threshold may be adjusted by a formula such as $F\_false\_neg=(k*f\_1*f\_2-c*f\_3)$ where k and c are predefined constants to normalize $f\_1$, $f\_2$, and $f\_3$. $F\_false\_neg$ may be used to continually adjust the threshold according to a linear relationship, such as $t\_1=t\_1+F\_false\_neg$. If the alert was a true positive, the threshold may not be adjusted. The modification may occur in advance of executing the counter-fraud operation with respect to the second set of data.

Consider the following example. An application program may be run to monitor, detect, or identify one or more transactions. An analyst may be provided with a number of alerts which may indicate a possible fraud event. A cumulative score may be formulated with respect to the first set of data based on a set of confidence scores, a set of module abstraction scores, and a set of user activity complexity scores. To determine a set of confidence scores, a set of user input data may be analyzed. The analyst may quickly determine that the alert is a true-positive and open a new case. The confidence score, $f\_1$, may be equal to 10. To determine a set of module abstraction scores, the different modules accessed by the analyst may be analyzed with respect to the pre-assigned abstraction scores. For example, the analyst may accessed two modules with a combined pre-assigned abstraction score of 9. The module abstraction score, f 2, may be equal to 9. To determine a set of activity complexity scores, a set of user-interaction module data may be analyzed. The analyst may interact with or change several (e.g., 8) settings in one module (which exceeds an established threshold number of settings). The set of activity complexity scores may be weighted based on importance of the interaction. The settings changed may be of little importance and may be weighted by a constant of ½. The activity complexity score, f 3, may be equal to 4. A cumulative score may be established based on a predetermined equation with predetermined constants. As an example, $F\_false\_neg=(k*f\_1*f\_2-c*f\_3)$ where k is equal to 16 and c is equal to 4. The cumulative score may be equal to $(16*10*9-4*4)=1424$. The overall cumulative score may be compared with a predetermined threshold cumulative score (e.g., 1200). The cumulative score may exceed the predetermined threshold cumulative score. As a result, the counter-fraud operation may be modified in advance of executing the counter-fraud operation with respect to the second set of data. The parameters may be adjusted based on $F\_false\_neg=1440$ according to a linear relationship, such as $t\_1=t\_1+F\_false\_neg$ where t 1 may include a predefined constant, such as 600. The parameters may be adjusted accordingly based on the linear relationship established. Other examples of modifying the parameter values based on an overall cumulative score may also be possible.

Method 700 concludes at block 799. Aspects of method 700 may provide performance or efficiency benefits related to counter-fraud operation management. Aspects may save resources such as bandwidth, processing, or memory. As an example, processing time may be saved by dynamically calculating an overall cumulative score to determine modifications to the set of parameter values. The parameter values may be adjusted automatically based on the continual calculation of a cumulative score (which exceeds a threshold cumulative score). This may prevent an analyst or other user from having to manually adjust parameter values which may require additional processing time. Other examples of saving processing time may also be possible.

Figure 8:
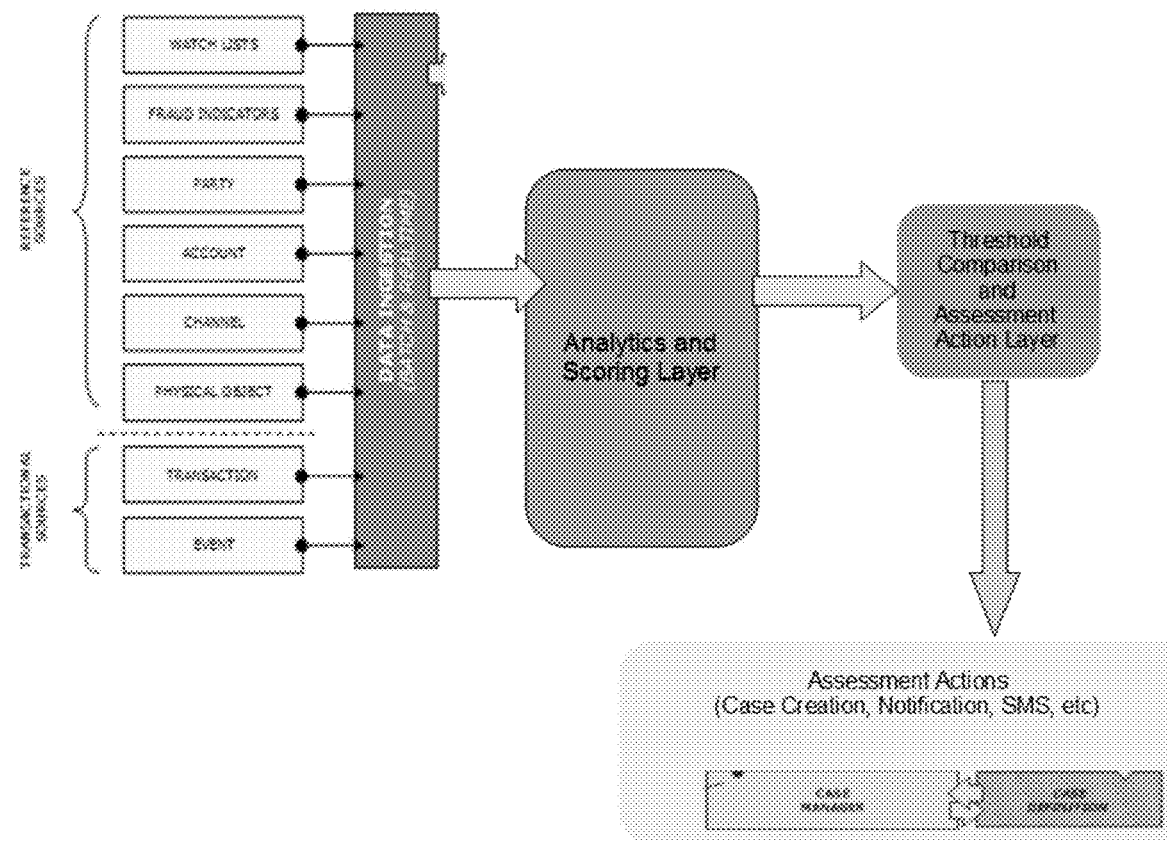
FIG. 8 shows an example system for counter-fraud operation management, according to embodiments.

FIG. 8 shows an example system for counter-fraud operation management, according to embodiments. Consider the following example. A counter-fraud operation management system may be used to detect fraud-indicative transactions and alert analysts of possible cases of fraud. A counter-fraud operation may be executed using an initial set of parameter values. An alert may be provided to an analyst of a possible fraud event (e.g., an ATM withdrawal of 5000). The analyst may determine an alert is a false-positive close the alert after only three seconds (which does not exceed a threshold temporal period of ten seconds). The temporal-oriented activity data may indicate that the parameter values may need to be modified based on the ease with which the analyst was able to identify a false-positive. The parameter values may be raised to alert the analyst of ATM withdrawals exceeding a threshold of 7000. The counter-fraud operation may be executed again using the new parameter values.

A set of user inputs may be collected to obtain a confidence metric ($f\_1$). The analyst may accept the alert (as a true-positive) and open a case, awarding a confidence score of 10. A set of user-interaction module data may be collected to obtain a set of module abstraction scores. The analyst may utilize various widgets to determine a false-positive alert. As an example, the alert properties module and the related alerts module may be utilized. The alert properties module may have a pre-assigned abstraction score of 7 and the related alerts module may have a pre-assigned score of 9. The abstraction scores may be summed to determine a module abstraction score ($f\_2$) of 16. A set of user feedback data may be collected to compute a set of activity complexity scores ($f\_3$). As an example, the analyst may access the related alerts module to view a transaction object. The module may assign a complexity score (based on the expansion of graph G). The complexity score for the transaction object may be equal to 4. The complexity score for another object, such as an accounts object, may be equal to 7. These scores may be weighted using the abstraction scores of each module. The related alerts module as described herein has a pre-assigned abstraction score of 7, so the complexity score for the transaction object may be equal to 28 while the complexity score for the accounts object may be equal to 49. These scores may be summed together to obtain a third cumulative score of 77.

Scores $f\_1$, $f\_2$, and $f\_3$ may be used to form a cumulative score to adjust the parameters using a formula, such as $F\_false\_neg=(k*f\_1*f\_2-c*f\_3)$ where k and c are pre-defined constants. In this example, k may equal 10 and c may equal 5, so $F\_false\_neg$ may be equal to 1215. $F\_false\_neg$ may be used to continually adjust the threshold line according to a linear relationship based on $F\_false\_neg=1215$. In another example, $f\_1$ may be equal to 6, $f\_2$ may be calculated as 13, and $f\_3$ may be computed to be equal to 20. The constants k and c may be equal to 2 and 5, respectively. In this example, $F\_false\_neg=56$. In this example, the parameters may not be adjusted as drastically (compared to $F\_false\_neg=1215$). Other examples may also be possible.

Figure 9:
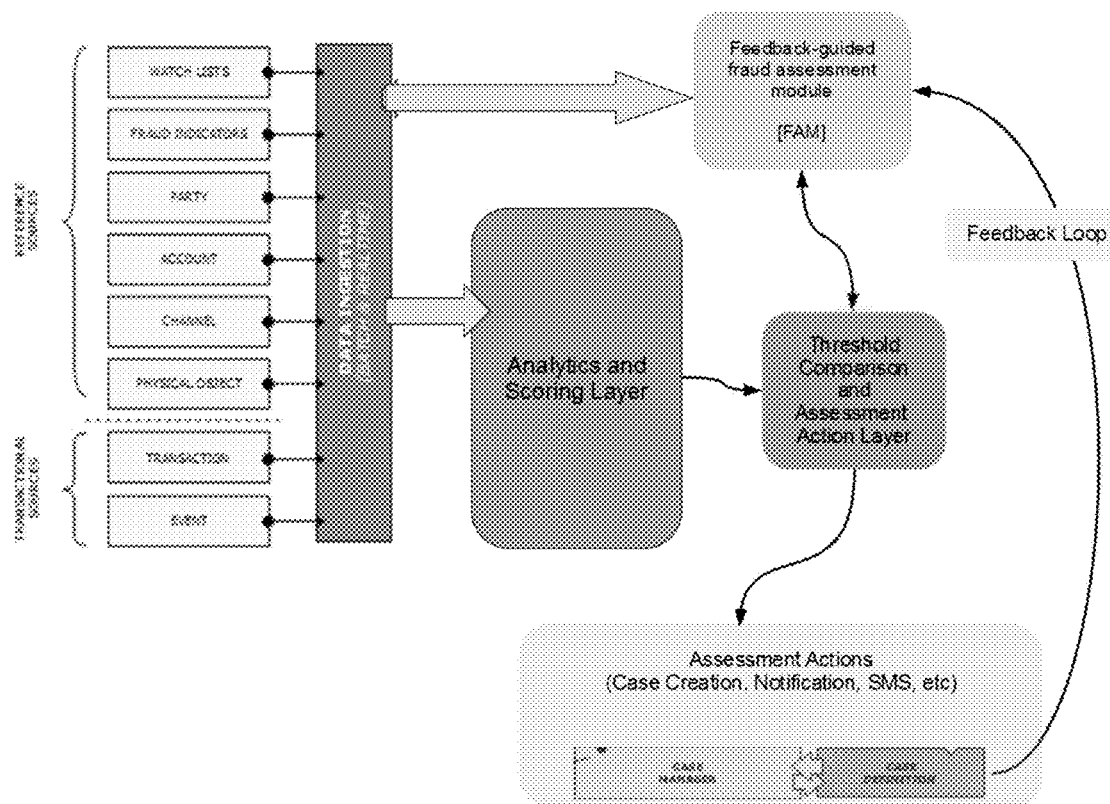
FIG. 9 shows an example system for counter-fraud operation management, according to embodiments.

FIG. 9 shows an example system for counter-fraud operation management, according to embodiments. Additional steps may be taken with respect to a semantic discovery module. Graph G may be leveraged to perform semantic queries starting from each object in the set of related objects. A number of hops may be calculated to determine whether a fraud-indicative relationship exists. As an example, a fraud-indicative object, such as a suspicious transaction, may exactly 10 hops from the pivot node (related object). The number of hops may be compared with a threshold number of hops to determine the strength of the fraud-indicative relationship. The threshold number of hops may be equal to 30. Since the measured number of hops does not exceed the threshold number of hops, the fraud-indicative relationship may be strong. An alert may be sent to the analyst to indicate the likelihood of a fraud event. The threshold number of hops may be equal to 3. Since the measured number of hops exceeds the threshold number of hops, the fraud-indicative relationship may be weak. An alert may not be sent to the analyst, since a fraud event is unlikely.

A measure of suspect annotative markings may also be measured and compared with a threshold number of suspect annotative markings to determine the strength of the fraud-indicative relationship. As an example, a suspicious transaction may include 3 CF_Violation markings and 5 ML markings for a total of 8 suspect annotative markings. The threshold number of suspect annotative markings may be equal to 4. Since the measured number of suspect annotative markings exceeds the threshold, the fraud-indicative relationship may be strong. An alert may be sent to the analyst to indicate the likelihood of a fraud event. The threshold number of hops may be equal to 12. Since the measured number of suspect annotative markings does not exceed the threshold, the fraud-indicative relationship may be weak. An alert may not be sent to the analyst, since a fraud event is unlikely. Other examples may also be possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer system for counter-fraud operation management, the computer system comprising:
   one or more computer processors, one or more computer-readable storage media, and program instructions stored on the one or more computer-readable storage media for execution by at least one of the one or more computer processors, the program instructions comprising:
   program instructions to execute, with respect to a first set of data, a counter-fraud operation using an initial set of parameter values for a set of parameters of the counter-fraud operation;
   program instructions to monitor a set of user counter-fraud activities of a fraud detection analyst interacting with a user interface, the set of counter-fraud activities are activities carried out by the fraud detection analyst to determine a false-positive identification of fraud with respect to the first set of data;
   program instructions to capture, based on the set of user counter-fraud activities of the fraud detection analyst, a set of user feedback data to determine a feedback-driven set of parameter values for the set of parameters of the counter-fraud operation;
   program instructions to determine, based on the set of user feedback data, the feedback-driven set of parameter values for the set of parameters of the counter-fraud operation; and
   program instructions to execute, with respect to a second set of data, the counter-fraud operation using the feedback-driven set of parameter values for the set of parameters based on the set of user feedback data.

2. The computer system of claim 1, further comprising:
   program instructions to detect that the set of user counter-fraud activities of the user corresponding to the user interface includes a set of user inputs;
   program instructions to capture, in the set of user feedback data, a set of user input data which is based on the set of user inputs;
   program instructions to determine, based on the set of user input data in the set of user feedback data, the feedback-driven set of parameter values for the set of parameters of the counter-fraud operation; and
   program instructions to execute, with respect to the second set of data, the counter-fraud operation using the feedback-driven set of parameter values for the set of parameters based on the set of user input data in the set of user feedback data.

3. The computer system of claim 1, further comprising:
   program instructions to detect that the set of user counter-fraud activities of the user corresponding to the user interface includes a set of user-accessed modules;
   program instructions to capture, in the set of user feedback data, a set of user-interaction module data which is based on the set of user-accessed modules;
   program instructions to determine, based on the set of user-interaction module data in the set of user feedback data, the feedback-driven set of parameter values for the set of parameters of the counter-fraud operation; and
   program instructions to execute, with respect to the second set of data, the counter-fraud operation using the feedback-driven set of parameter values for the set of parameters based on the set of user-interaction module data in the set of user feedback data.

4. The computer system of claim 1, further comprising:
program instructions to detect that the set of user counter-fraud activities of the user corresponding to the user interface includes a sequence of a set of user actions;
program instructions to capture, in the set of user feedback data, a set of user action sequence data which is based on the sequence of the set of user actions;
program instructions to determine, based on the set of user action sequence data in the set of user feedback data, the feedback-driven set of parameter values for the set of parameters of the counter-fraud operation; and
program instructions to execute, with respect to the second set of data, the counter-fraud operation using the feedback-driven set of parameter values for the set of parameters based on the set of user action sequence data in the set of user feedback data.

5. The computer system of claim 1, further comprising:
program instructions to detect that the set of user counter-fraud activities of the user corresponding to the user interface includes a set of temporal periods related to the set of user counter-fraud activities;
program instructions to capture, in the set of user feedback data, a set of temporal-oriented activity data which is based on the set of temporal periods related to the set of user counter-fraud activities;
program instructions to determine, based on the set of temporal-oriented activity data in the set of user feedback data, the feedback-driven set of parameter values for the set of parameters of the counter-fraud operation; and
program instructions to execute, with respect to the second set of data, the counter-fraud operation using the feedback-driven set of parameter values for the set of parameters based on the set of temporal-oriented activity data in the set of user feedback data.

6. The computer system of claim 1, further comprising:
program instructions to ascertain, based on the set of user feedback data, a set of confidence scores which pertains to the set of user counter-fraud activities related to false-positive identification with respect to the first set of data; and
program instructions to determine, based on the set of confidence scores which pertains to the set of user counter-fraud activities related to false-positive identification with respect to the first set of data, the feedback-driven set of parameter values for the set of parameters of the counter-fraud operation; and
program instructions to execute, with respect to the second set of data, the counter-fraud operation using the feedback-driven set of parameter values for the set of parameters based on the set of confidence scores.

7. The computer system of claim 1, further comprising:
program instructions to compute, based on the set of user feedback data, a set of activity complexity scores which pertains to the set of user counter-fraud activities related to false-positive identification with respect to the first set of data; and
program instructions to determine, based on the set of activity complexity scores which pertains to the set of user counter-fraud activities related to false-positive identification with respect to the first set of data, the feedback-driven set of parameter values for the set of parameters of the counter-fraud operation; and
program instructions to execute, with respect to the second set of data, the counter-fraud operation using the feedback-driven set of parameter values for the set of parameters based on the set of activity complexity scores.

8. The computer system of claim 1, further comprising:
program instructions to configure the feedback-driven set of parameter values for the set of parameters to include a set of triggering thresholds for the set of parameters of the counter-fraud operation; and
program instructions to provide, in response to an achievement of the set of triggering thresholds, an alert.

9. The computer system of claim 1, further comprising:
program instructions to identify that the set of user feedback data indicates both a false-positive for the first set of data and an extent of the set of user counter-fraud activities which correlates to the false-positive;
program instructions to resolve, based on the extent of the set of user counter-fraud activities which correlates to the false-positive, the feedback-driven set of parameter values for the set of parameters of the counter-fraud operation; and
program instructions to execute, with respect to a second set of data, the counter-fraud operation using the feedback-driven set of parameter values for the set of parameters based on the extent of the set of user counter-fraud activities which correlates to the false-positive.

10. The computer system of claim 1, further comprising:
program instructions to collect, from the first set of data, a set of fraud-indicative objects;
program instructions to perform, using an enterprise ontology, a set of semantic queries on the set of fraud-indicative objects;
program instructions to determine, based on the set of semantic queries on the set of fraud-indicative objects, a set of fraud-indicative relationships using a set of ontology annotation data; and
program instructions to override, based on the set of fraud-indicative relationships determined using the set of ontology annotation data, the feedback-driven set of parameter values for the set of parameters of the counter-fraud operation.

11. A computer program product for counter-fraud operation management, the computer system comprising:
one or more computer processors, one or more computer-readable storage media, and program instructions stored on the one or more computer-readable storage media for execution by at least one of the one or more computer processors, the program instructions comprising:
program instructions to execute, with respect to a first set of data, a counter-fraud operation using an initial set of parameter values for a set of parameters of the counter-fraud operation;
program instructions to monitor a set of user counter-fraud activities of a fraud detection analyst interacting with a user interface, the set of counter-fraud activities are activities carried out by the fraud detection analyst to determine a false-positive identification of fraud with respect to the first set of data;
program instructions to capture, based on the set of user counter-fraud activities of the fraud detection analyst, a set of user feedback data to determine a feedback-driven set of parameter values for the set of parameters of the counter-fraud operation;

program instructions to determine, based on the set of user feedback data, the feedback-driven set of parameter values for the set of parameters of the counter-fraud operation; and program instructions to execute, with respect to a second set of data, the counter-fraud operation using the feedback-driven set of parameter values for the set of parameters based on the set of user feedback data.

12. The computer program product of claim 11, further comprising:

program instructions to detect that the set of user counter-fraud activities of the user corresponding to the user interface includes a set of user inputs;

program instructions to capture, in the set of user feedback data, a set of user input data which is based on the set of user inputs;

program instructions to determine, based on the set of user input data in the set of user feedback data, the feedback-driven set of parameter values for the set of parameters of the counter-fraud operation; and program instructions to execute, with respect to the second set of data, the counter-fraud operation using the feedback-driven set of parameter values for the set of parameters based on the set of user input data in the set of user feedback data.

13. The computer program product of claim 11, further comprising:

program instructions to detect that the set of user counter-fraud activities of the user corresponding to the user interface includes a set of user-accessed modules;

program instructions to capture, in the set of user feedback data, a set of user-interaction module data which is based on the set of user-accessed modules;

program instructions to determine, based on the set of user-interaction module data in the set of user feedback data, the feedback-driven set of parameter values for the set of parameters of the counter-fraud operation; and program instructions to execute, with respect to the second set of data, the counter-fraud operation using the feedback-driven set of parameter values for the set of parameters based on the set of user-interaction module data in the set of user feedback data.

14. The computer program product of claim 11, further comprising:

program instructions to detect that the set of user counter-fraud activities of the user corresponding to the user interface includes a sequence of a set of user actions;

program instructions to capture, in the set of user feedback data, a set of user action sequence data which is based on the sequence of the set of user actions;

program instructions to determine, based on the set of user action sequence data in the set of user feedback data, the feedback-driven set of parameter values for the set of parameters of the counter-fraud operation; and program instructions to execute, with respect to the second set of data, the counter-fraud operation using the feedback-driven set of parameter values for the set of parameters based on the set of user action sequence data in the set of user feedback data.

15. The computer program product of claim 11, further comprising:

program instructions to detect that the set of user counter-fraud activities of the user corresponding to the user interface includes a set of temporal periods related to the set of user counter-fraud activities;

program instructions to capture, in the set of user feedback data, a set of temporal-oriented activity data which is based on the set of temporal periods related to the set of user counter-fraud activities;

program instructions to determine, based on the set of temporal-oriented activity data in the set of user feedback data, the feedback-driven set of parameter values for the set of parameters of the counter-fraud operation; and program instructions to execute, with respect to the second set of data, the counter-fraud operation using the feedback-driven set of parameter values for the set of parameters based on the set of temporal-oriented activity data in the set of user feedback data.

16. The computer program product of claim 11, further comprising:

program instructions to ascertain, based on the set of user feedback data, a set of confidence scores which pertains to the set of user counter-fraud activities related to false-positive identification with respect to the first set of data; and program instructions to determine, based on the set of confidence scores which pertains to the set of user counter-fraud activities related to false-positive identification with respect to the first set of data, the feedback-driven set of parameter values for the set of parameters of the counter-fraud operation; and program instructions to execute, with respect to the second set of data, the counter-fraud operation using the feedback-driven set of parameter values for the set of parameters based on the set of confidence scores.

17. The computer program product of claim 11, further comprising:

program instructions to compute, based on the set of user feedback data, a set of activity complexity scores which pertains to the set of user counter-fraud activities related to false-positive identification with respect to the first set of data; and program instructions to determine, based on the set of activity complexity scores which pertains to the set of user counter-fraud activities related to false-positive identification with respect to the first set of data, the feedback-driven set of parameter values for the set of parameters of the counter-fraud operation; and program instructions to execute, with respect to the second set of data, the counter-fraud operation using the feedback-driven set of parameter values for the set of parameters based on the set of activity complexity scores.

18. The computer program product of claim 11, further comprising:

program instructions to configure the feedback-driven set of parameter values for the set of parameters to include a set of triggering thresholds for the set of parameters of the counter-fraud operation; and program instructions to provide, in response to an achievement of the set of triggering thresholds, an alert.

19. The computer program product of claim 11, further comprising:

program instructions to identify that the set of user feedback data indicates both a false-positive for the first set of data and an extent of the set of user counter-fraud activities which correlates to the false-positive;

program instructions to resolve, based on the extent of the set of user counter-fraud activities which correlates to the false-positive, the feedback-driven set of parameter values for the set of parameters of the counter-fraud operation; and program instructions to execute, with respect to a second set of data, the counter-fraud operation using the feedback-driven set of parameter values for the set of parameters based on the extent of the set of user counter-fraud activities which correlates to the false-positive.

20. The computer program product of claim 11, further comprising:

program instructions to collect, from the first set of data, a set of fraud-indicative objects;

program instructions to perform, using an enterprise ontology, a set of semantic queries on the set of fraud-indicative objects;

program instructions to determine, based on the set of semantic queries on the set of fraud-indicative objects, a set of fraud-indicative relationships using a set of ontology annotation data; and program instructions to override, based on the set of fraud-indicative relationships determined using the set of ontology annotation data, the feedback-driven set of parameter values for the set of parameters of the counter-fraud operation.

* * * * *